US012726270B1

(12) United States Patent
Valdez et al.

(10) Patent No.: US 12,726,270 B1
(45) Date of Patent: Sep. 1, 2026

(54) METHOD AND SYSTEM FOR AUTOMATICALLY IDENTIFYING CONNECTED PORTS WITHIN A PON

(71) Applicant: FRONTIER COMMUNICATIONS HOLDINGS, LLC, Dallas, TX (US)

(72) Inventors: John Valdez, Copper Canyon, TX (US); James Steacy, Dallas, TX (US); Bryan Pauling, Rochester, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/380,808

(22) Filed: Nov. 5, 2025

(51) Int. Cl.
*H04B 10/07* (2013.01)
*H04B 10/077* (2013.01)
*H04B 10/27* (2013.01)

(52) U.S. Cl.
CPC ......... *H04B 10/0773* (2013.01); *H04B 10/27* (2013.01)

(58) Field of Classification Search
CPC ...................................................... H04B 10/07
See application file for complete search history.

(56) References Cited

U.S. PATENT DOCUMENTS 9,755,736 B2 9/2017 Kim et al.
10,018,799 B2 7/2018 Gu et al.
10,477,511 B2 11/2019 Ohlarik et al.
10,756,818 B2 8/2020 Vardarajan et al.
11,102,660 B2 8/2021 Dabrowski et al.
11,197,262 B2 12/2021 Soma et al.
11,356,177 B1 6/2022 Valdez et al.
11,375,449 B2 6/2022 Moreman et al.
11,575,432 B1 * 2/2023 Valdez ................. H04B 10/674
11,962,343 B1 * 4/2024 Alba .................. H04B 10/0791
12,114,114 B1 * 10/2024 Valdez ............... H04Q 11/0067
12,136,944 B1 11/2024 Valdez et al.
12,267,104 B1 4/2025 Valdez et al.

(Continued)

FOREIGN PATENT DOCUMENTS

CN 106464369 A 2/2017
WO WO-9914929 3/1999
WO WO-2011048207 4/2011

OTHER PUBLICATIONS

U.S. Appl. No. 18/636,808, Non-final Office Action, dated Jun. 11, 2024.

(Continued)

*Primary Examiner* — Shi K Li

(57) ABSTRACT

Techniques for identifying connected ports in a Passive Optical Network (PON) include establishing a communication session with an optical network terminal (ONT) in a PON via a short-range communication link. The PON includes an optical line terminal (OLT) optically connected to the ONT via one or more optical fibers and a distribution port. Furthermore, the techniques include obtaining and presenting indications of distribution ports in the PON and ONTs corresponding to the distribution ports. The ONTs include the particular ONT which is in communication with the client device. Additionally, the techniques include obtaining an indication of a different distribution port corresponding to the particular ONT, and storing the different distribution port in association with the particular ONT.

20 Claims, 19 Drawing Sheets

(56) References Cited

U.S. PATENT DOCUMENTS

| | | | | |
|---|---|---|---|---|
| 2004/0160905 | A1 | 8/2004 | Bernier et al. | |
| 2005/0105873 | A1 | 5/2005 | Reagan et al. | |
| 2007/0217788 | A1 | 9/2007 | Gao et al. | |
| 2008/0031621 | A1 | 2/2008 | Kuo et al. | |
| 2011/0255860 | A1 | 10/2011 | Lee et al. | |
| 2012/0007533 | A1 | 1/2012 | Ogawa et al. | |
| 2012/0075343 | A1 | 3/2012 | Chen et al. | |
| 2015/0091780 | A1 | 4/2015 | Lyren | |
| 2016/0295307 | A1* | 10/2016 | Kikuzawa | H04Q 11/0067 |
| 2018/0006719 | A1 | 1/2018 | Cress et al. | |
| 2018/0262533 | A1* | 9/2018 | McCaig | H04W 12/122 |
| 2018/0337785 | A1 | 11/2018 | Sanciangco et al. | |
| 2022/0141082 | A1* | 5/2022 | Brun | G06T 7/001 709/223 |
| 2023/0013084 | A1* | 1/2023 | Perry | H04B 10/614 |
| 2024/0171524 | A1 | 5/2024 | Bostoen et al. | |
| 2024/0177436 | A1 | 5/2024 | Ito et al. | |
| 2024/0281899 | A1* | 8/2024 | Shah | G06Q 40/125 |

OTHER PUBLICATIONS

U.S. Appl. No. 18/636,808, Notice of Allowance, dated Sep. 3, 2024.

U.S. Appl. No. 18/636,823, Final Office Action, dated Aug. 29, 2024.

U.S. Appl. No. 18/636,823, Non-final Office Action, dated Jun. 21, 2024.

U.S. Appl. No. 18/636,823, Notice of Allowance, dated Nov. 18, 2024.

U.S. Appl. No. 18/889,728, Non-final Office Action, dated Nov. 20, 2024.

U.S. Appl. No. 18/889,728, Notice of Allowance, dated Jan. 22, 2025.

U.S. Appl. No. 18/962,086, Final Office Action, dated Apr. 17, 2025.

U.S. Appl. No. 18/962,086, Non-final Office Action, dated Jan. 31, 2025.

U.S. Appl. No. 18/962,086, Notice of Allowance, dated Jul. 15, 2025.

U.S. Appl. No. 19/062,499, Non-final Office Action, dated Apr. 24, 2025.

U.S. Appl. No. 19/062,499, Notice of Allowance, dated Jul. 1, 2025.

U.S. Appl. No. 19/370,541, Nonfinal Office Action, dated Jan. 7, 2026.

U.S. Appl. No. 19/322,389, Nonfinal Office Action, dated Dec. 10, 2025.

U.S. Appl. No. 19/380,720, Nonfinal Office Action, dated Jan. 13, 2026.

* cited by examiner

200

250

Figure 3A:
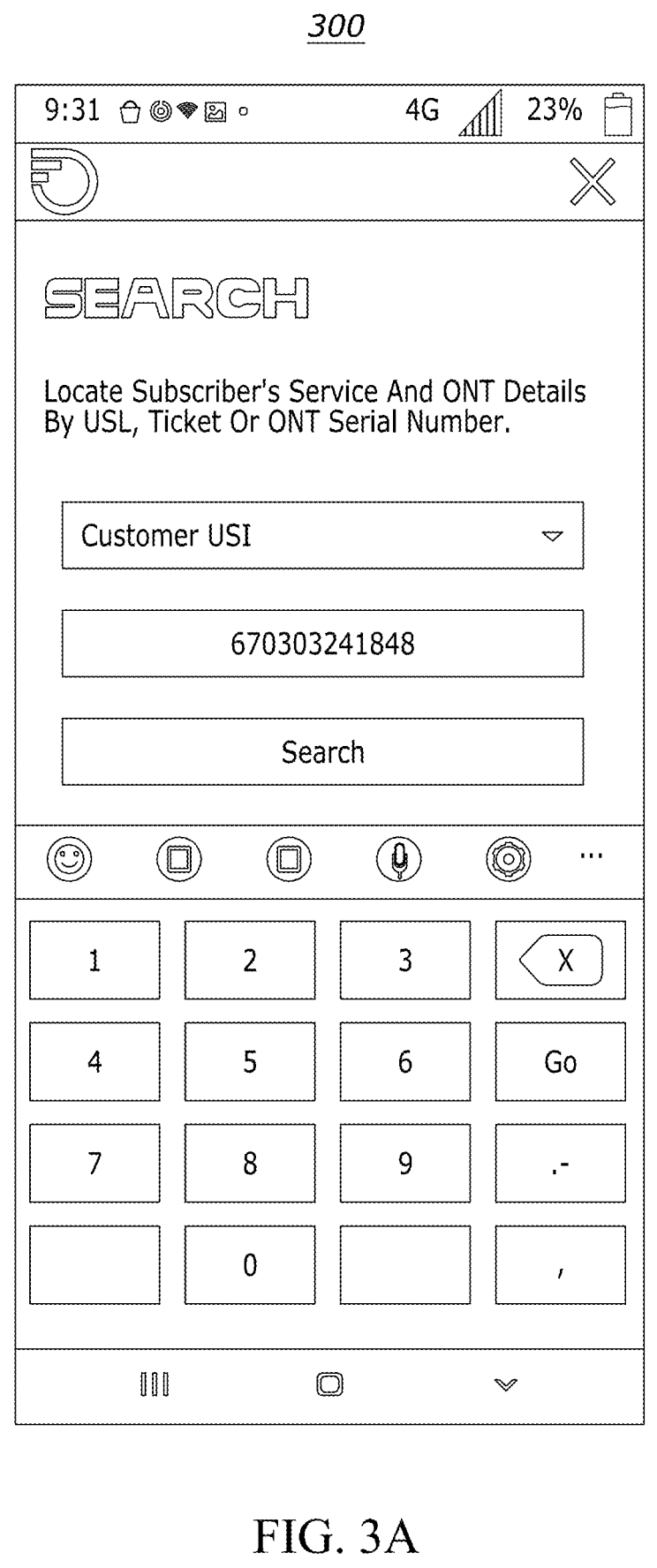

300

9:31 4G 23%

SEARCH

Locate Subscriber's Service And ONT Details By USL, Ticket Or ONT Serial Number.

Customer USI

670303241848

Search 1 2 3 X
4 5 6 Go
7 8 9 .-
0 ,

Figure 3B:
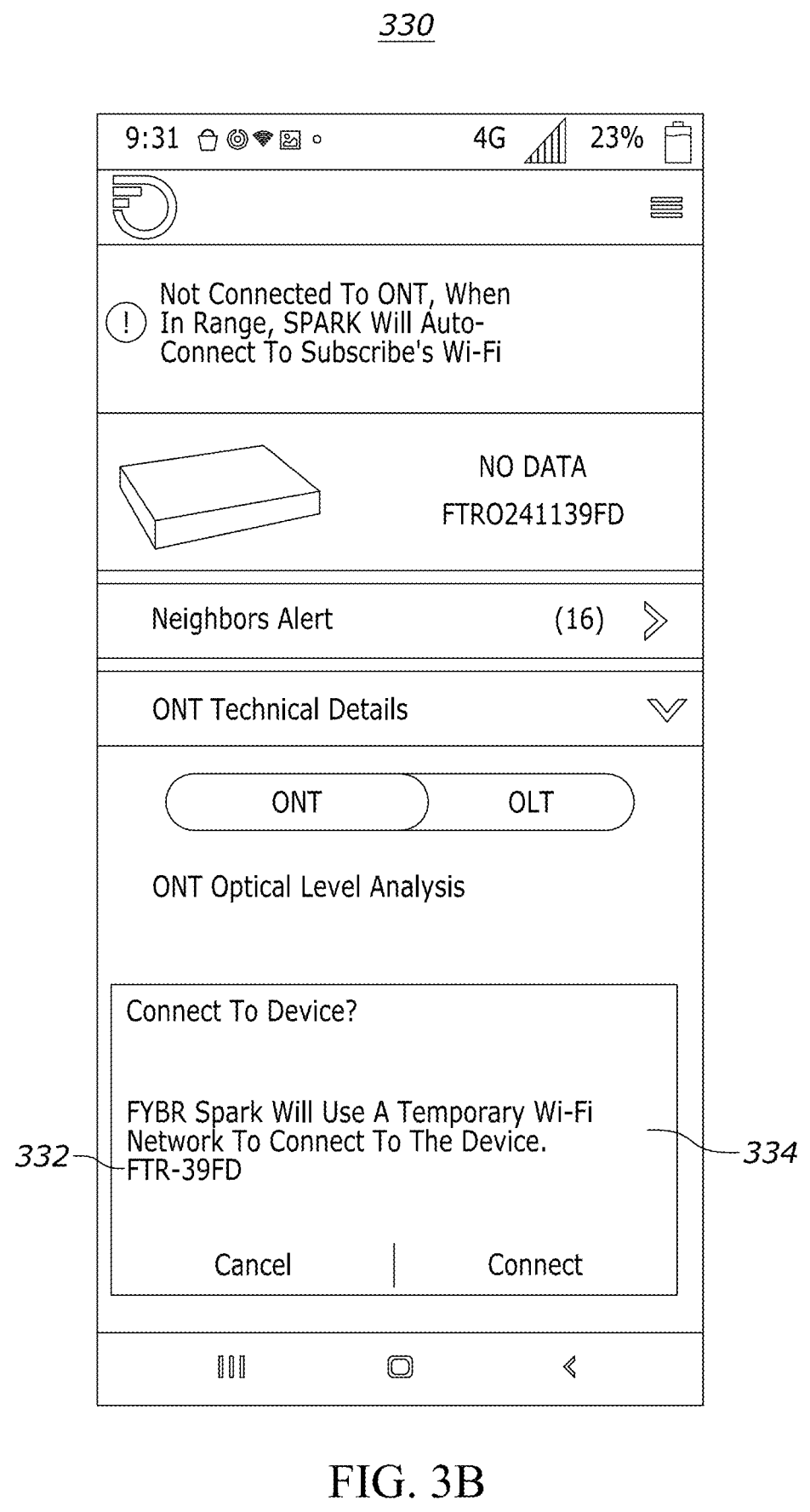

Not Connected To ONT, When In Range, SPARK Will Auto-Connect To Subscribe's Wi-Fi

NO DATA

FTRO241139FD

Neighbors Alert (16)

ONT Technical Details

ONT OLT

ONT Optical Level Analysis

Connect To Device?

FYBR Spark Will Use A Temporary Wi-Fi Network To Connect To The Device.

332 FTR-39FD

334

Cancel Connect

Figure 3C:
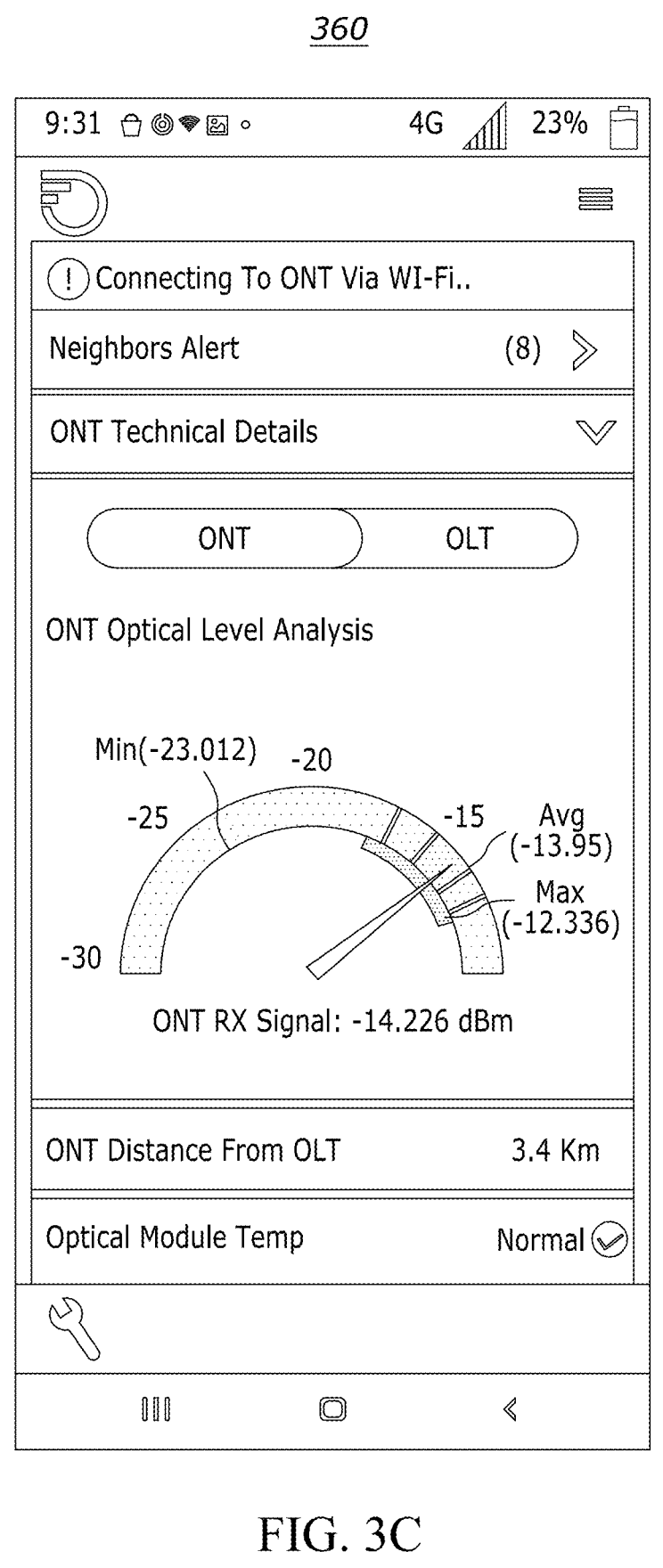

Connecting To ONT Via WI-Fi..

Neighbors Alert (8)

ONT Technical Details

ONT OLT

ONT Optical Level Analysis

Min(-23.012) -20 -25 -15 Avg (-13.95) Max (-12.336) -30

ONT RX Signal: -14.226 dBm

ONT Distance From OLT 3.4 Km

Optical Module Temp Normal

Figure 5:
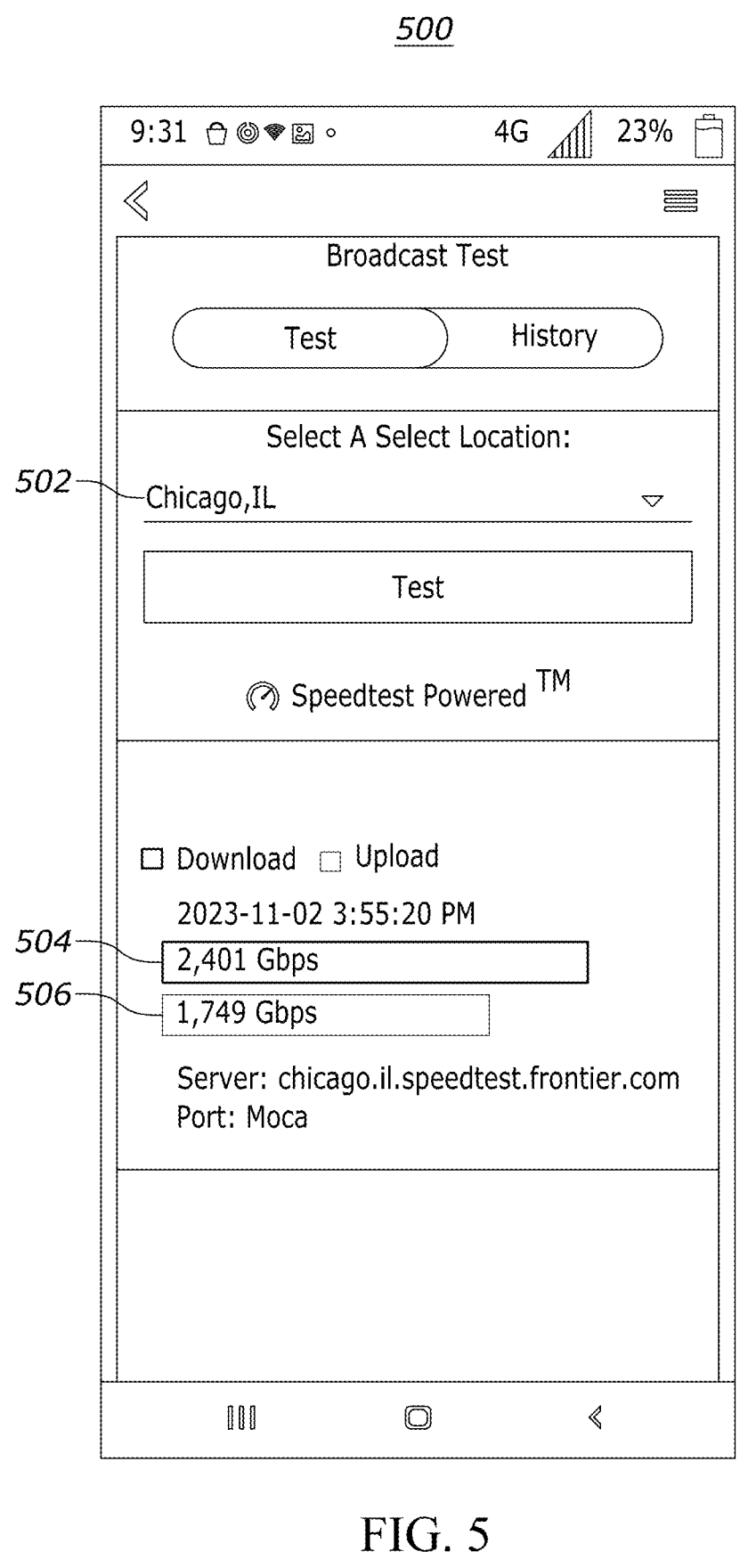

Broadcast Test

Test History

Select A Select Location:

502 Chicago,IL

Test

Speedtest Powered TM

Download Upload 2023-11-02 3:55:20 PM 504 2,401 Gbps 506 1,749 Gbps

Server: chicago.il.speedtest.frontier.com
Port: Moca

Figure 9:
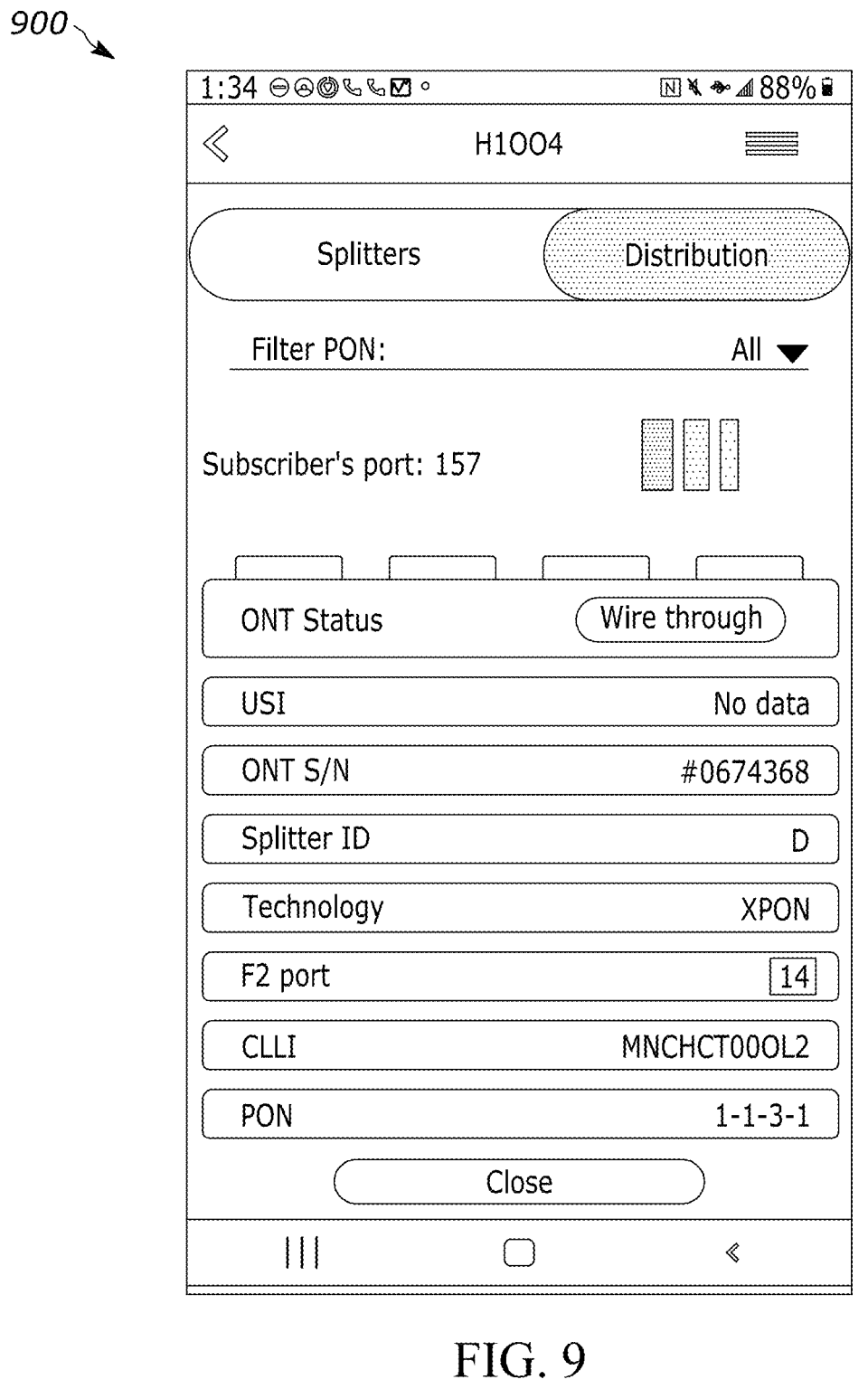

Splitters Distribution

Filter PON: All

Subscriber's port: 157

ONT Status Wire through

USI No data

ONT S/N #0674368

Splitter ID D

Technology XPON

F2 port 14

CLLI MNCHCT00OL2

PON 1-1-3-1

Close

METHOD AND SYSTEM FOR AUTOMATICALLY IDENTIFYING CONNECTED PORTS WITHIN A PON

FIELD OF THE DISCLOSURE

This disclosure relates generally to passive optical networks (PONs), and, more particularly, to systems and methods for directly connecting to a device in the PON and identifying connected ports within the PON.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

When a PON experiences a network failure (e.g., equipment malfunctions, signal loss, network congestion, broken optical fibers, or other technical issues), the effects are typically observed by customers or end-users at locations at which last mile termination units are disposed. For example, a customer may observe a slowing down or lack of fidelity of PON services at his or her location, and may contact the PON service provider for assistance.

However, a technician typically needs to have years of experience with troubleshooting to understand how to properly repair the network failure. Additionally, the technician may have difficulty locating the network equipment within a customer's residence. Moreover, it can be time consuming for the technician to correctly diagnose the problem before beginning the repair. Even if the technician is able to read information from the ONT, technicians may need years of training and experience before they can quickly identify the problem and resolve the issue.

SUMMARY

To automatically identify connected ports within a PON, a user directly connects their client device to an ONT or another device in the PON (e.g., an FDT, an FDH, etc.) by establishing a communication session with the ONT via a short-range communication link. For example, the client device and the ONT may connect using Wi-Fi, Bluetooth, or near field communication (NFC). The client device presents a PON repair application with indications of the distribution ports within FDHs in the PON and the ONTs connected to the distribution ports. The PON repair application identifies the ONT connected to the client device and highlights the distribution port for the ONT connected to the client device. Additionally, the PON repair application includes a user control for changing the distribution port for the ONT connected to the client device. For example, a user such as a service technician may connect the ONT to a different distribution port and enter the new distribution port via the user control. The client device may update the new distribution port for the ONT and transmit the new distribution port for the ONT to a server that stores a record of FDHs, splitters, distribution ports, and ONTs connected to the distribution ports.

In this manner, when a service technician launches the PON repair application, the service technician may view the distribution port corresponding to each ONT in the PON. The service technician may connect their client device to an ONT and immediately identify the distribution port connected to that ONT. Accordingly, if for example, the optical fiber coupled to the ONT needs to be replaced, the service technician knows which distribution port to connect the other end of the optical fiber.

The PON repair application may provide step-by-step instructions for repairing the ONT which may include replacing the optical fiber and reconnecting a new optical fiber to the ONT on one end and to the identified distribution port on the other. In some implementations, the client device includes a transparent display, such as a camera view depicting the area in front of the user in the camera view. For example, the client device may be a wearable device such as a virtual reality (VR) and/or augmented reality (AR) headset or smart glasses. When the user is facing the ONT or the FDH, the transparent display may include a camera view of the ONT or the FDH with the step-by-step instructions overlaid on the transparent display. The instructions may be presented in an area of the transparent display which does not obstruct the user's view of the ONT or the FDH, so that the user can simultaneously view the instructions and the ONT or the FDH to perform the repairs while reading the instructions.

Additionally, the client device may overlay AR features on the transparent display to further guide the user when making the repair. For example, the client device may analyze images in the camera view to identify objects within the camera view, such as the ONT, the FDH, optical fibers coupled to the ONT, the ports on the ONT, the distribution ports on splitters in the FDH, light emitting diodes (LEDs) on the ONT, etc. The client device may then overlay AR features to highlight certain components of the ONT or the FDH corresponding to the instructions for repairing the ONT. For example, an instruction may be to replace a particular optical fiber connected to the ONT and the FDH at a particular distribution port. The client device may overlay an AR feature (e.g., a transparent green oval) over a port in the ONT for connecting one end of the optical fiber. The client device may also overlay another AR feature (e.g., a transparent blue oval) over a particular distribution port on a splitter in the FDH for connecting the other end of the optical fiber. By overlaying AR features over portions of the camera view that correspond to the instructions, the client device makes it easier for the user to successfully perform the repair. This may increase the speed and the success rate of repairs for devices in a PON.

In an embodiment, a method for identifying connected ports in a Passive Optical Network (PON) is provided. The method includes establishing a communication session, by a client device via a short-range communication link, with a particular optical network terminal (ONT) in a PON. The PON includes an optical line terminal (OLT) optically connected to the ONT via one or more optical fibers and a distribution port. The method further includes obtaining, by the client device, indications of a plurality of distribution ports in the PON and a plurality of ONTs corresponding to the plurality of distribution ports. The plurality of ONTs include the particular ONT which is in communication with the client device. Additionally, the method includes presenting, by the client device via a PON repair application, the indications of the plurality of distribution ports in the PON and the plurality of ONTs corresponding to the plurality of distribution ports, obtaining, by the client device via the PON repair application, an indication of a different distribution port corresponding to the particular ONT, and storing, by the client device via the PON repair application, the different distribution port in association with the particular ONT.

In another embodiment, a client device for identifying connected ports in a Passive Optical Network (PON) includes one or more processors, and a non-transitory computer-readable memory storing instructions thereon. When executed by the one or more processors, the instructions cause the client device to establish a communication session, via a short-range communication link, with a particular optical network terminal (ONT) in a PON. The PON includes an optical line terminal (OLT) optically connected to the ONT via one or more optical fibers and a distribution port. The instructions further cause the client device to obtain indications of a plurality of distribution ports in the PON and a plurality of ONTs corresponding to the plurality of distribution ports. The plurality of ONTs include the particular ONT which is in communication with the client device. Additionally, the instructions cause the client device to present, via a PON repair application, the indications of the plurality of distribution ports in the PON and the plurality of ONTs corresponding to the plurality of distribution ports, obtain, via the PON repair application, an indication of a different distribution port corresponding to the particular ONT, and store, via the PON repair application, the different distribution port in association with the particular ONT.

In yet another embodiment, a non-transitory computer-readable memory stores instructions thereon. When executed by one or more processors, the instructions cause the one or more processors to establish a communication session, via a short-range communication link, with a particular optical network terminal (ONT) in a PON. The PON includes an optical line terminal (OLT) optically connected to the ONT via one or more optical fibers and a distribution port. The instructions further cause the one or more processors to obtain indications of a plurality of distribution ports in the PON and a plurality of ONTs corresponding to the plurality of distribution ports. The plurality of ONTs include the particular ONT which is in communication with the one or more processors in a client device. Additionally, the instructions cause the one or more processors to present, via a PON repair application, the indications of the plurality of distribution ports in the PON and the plurality of ONTs corresponding to the plurality of distribution ports, obtain, via the PON repair application, an indication of a different distribution port corresponding to the particular ONT, and store, via the PON repair application, the different distribution port in association with the particular ONT.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

FIGS. 3A-3C illustrate example displays of a PON repair application for connecting to a particular ONT by searching for the particular ONT and identifying a Wi-Fi signal broadcasted by the particular ONT, which may be presented on a client device.

FIG. 5 illustrates an example display of a PON repair application for executing a speed test for the particular ONT, which may be presented on a client device.

FIGS. 6A and 6B illustrate example displays of a PON repair application for executing a dial tone test for the particular ONT, which may be presented on a client device.

FIG. 9 illustrates an example display of a PON repair application that provides additional distribution port information in response to receiving a selection of one of the distribution ports shown in FIG. 8, which may be presented on a client device.

FIG. 10 illustrates an example display of a PON repair application indicating the distribution port connected to the particular ONT and including a user control for changing the distribution port, which may be presented on a client device.

Figure 1:
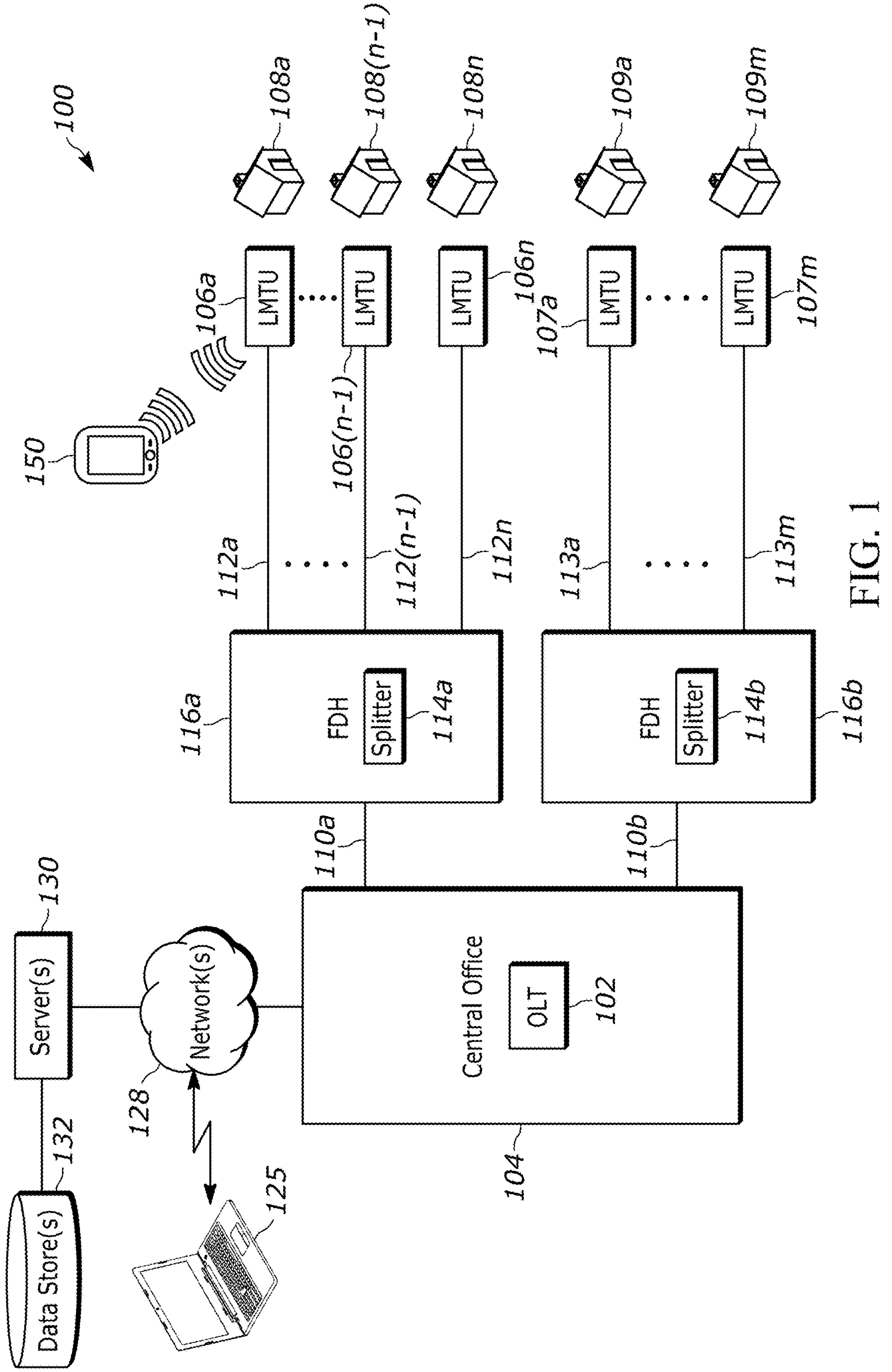
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Examples of the disclosure provide a number of advantages over existing techniques for identifying connected ports within a PON. Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106*a*, . . . , 106*n* at respective customer premises 108*a*, . . . , 108*n*. The last mile termination units 106*a*, . . . , 106*n* may be located outside and/or inside the customer premises or locations 108*a*, . . . , 108*n*. Each last mile termination unit 106*a*, . . . , 106*n* may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110*a* from the OLT 102 (which is interchangeably referred to herein as an "F1 optical fiber 110*a*" or a "primary optical fiber 110*a*") serves the one or more last mile termination units 106*a*, . . . , 106*n* via respective distribution optical fibers 112*a*, . . . , 112*n* (which are interchangeably referred to herein as "F2 optical fibers 112*a*, . . . , 112*n*" or "secondary optical fibers 112*a*, . . . , 112*n*"). In the illustrated example, the first feeder optical fiber 110*a* is optically coupled to the plurality of last mile termination units 106*a*, . . . , 106*n* via an example one-to-many optical splitter 114*a* which is disposed, located, implemented, etc. in an example fiber distribution hub (FDH) 116*a*. The one-to-many optical splitter 114*a* includes a first subset distribution ports for connecting the distribution optical fibers 112*a*, . . . , 112*n*. In some arrangements, the FDH 116*a* is located within a geographic area (e.g., a neighborhood) such that the customer premises 108*a*, . . . , 108*n* are proximally close to the FDH 116*a*, and typically each of the customer premises 108*a*, . . . , 108*n* and respective last mile termination units 106*a*, . . . , 106*n* is disposed at a different optical distance from the FDH 116*a*. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110*b* from the OLT 102 that is optically coupled to another plurality of last mile termination units 107*a*-107*m* at respective customer premises 109*a*-109*m* via another many-to-one optical splitter 114*b* having a second subset of distribution ports and included in another fiber distribution hub 116*b* and via respective secondary optical fibers 113*a*-113*m*.

As utilized herein, the "components" of the PON 100 generally refer to the devices, nodes, and optical fibers of the PON 100. For example, the components of the PON 100 shown in FIG. 1 may include the OLT 102, the FDHs 116*a*, 116*b*, the optical splitters 114*a*, 114*b*, the LMTUs 106*a*-106*n* and 107*a*-107*m*, and the optical fibers interconnecting the devices or nodes, e.g., the optical fibers 110*a*-110*b*, 112*a*-112*n*, and 113*a*-113*m*.

In some scenarios, an optical terminal (e.g., the OLT 102 and/or one or more the last mile termination units 106*a*-106*n*, 107*a*-107*m*) communicates with a computing device. For example, the OLT 102 and/or the one or more LMTUs 106*a*-106*n*, 107*a*-107*m* may transmit or receive data from a computing device 125 (e.g., a laptop, a computer, a tablet, a mobile phone, etc.) associated with a service technician or other agent of the PON 100 or a computing device associated with a customer.

In some examples, the computing device 125 communicates with an LMTU 106*a*-106*n*, 107*a*-107*m* via one or more networks 128 (which may include one or more wired and/or wireless private networks and/or public networks, such as the Internet). In other examples, a client computing device 150 (also referred to herein as a "client device") communicates directly with the LMTU 106*a*-106*n*, 107*a*-107*m* by establishing a communication session with the LMTU 106*a*-106*n*, 107*a*-107*m* over a short-range communication link, such as Bluetooth, Wi-Fi, or near field communication (NFC). The client device 150 may also be associated with a service technician, other agent of the PON 100, or a customer. Then during the communication session, the client device 150 and the LMTU 106*a*-106*n*, 107*a*-107*m* may directly transmit information back and forth to each other. For example, the LMTU 106*a*-106*n*, 107*a*-107*m* may transmit diagnostic information to the client device 150 which may be presented on a user interface of the client device 150 via a PON repair application. The client device 150 may transmit control signals to the LMTU 106*a*-106*n*, 107*a*-107*m* for the LMTU 106*a*-106*n*, 107*a*-107*m* to perform diagnostic tests, such as a dial tone test or a speed test.

The client device 150 may be a portable device such as a smart phone or a tablet computer, for example. The client device 150 may also be a laptop computer, a desktop computer, a personal digital assistant (PDA), a wearable device such as a smart watch or smart glasses, a virtual reality headset, etc.

The client device 150 may include one or more processor(s) and a memory storing machine-readable instructions executable on the processor(s). The processor(s) may include one or more general-purpose processors (e.g., CPUs), and/or special-purpose processing units (e.g., graphical processing units (GPUs)). The memory may be a non-transitory memory and can include one or several suitable memory modules, such as random access memory (RAM), read-only memory (ROM), flash memory, other types of persistent memory, etc. The memory may store instructions for implementing a PON repair application for directly connecting to an LMTU 106*a*-106*n*, 107*a*-107*m* and establishing a communication session with the LMTU 106*a*-106*n*, 107*a*-107*m* to receive diagnostic information for identifying the cause of a network failure. The PON repair application may also provide instructions for repairing the LMTU 106*a*-106*n*, 107*a*-107*m* and/or may present other graphical indications to guide a user through a repair.

Additionally, the client device 150 may include sensors, such as a positioning sensor (e.g., a Global Positioning System (GPS)), an accelerometer, an infrared sensor, a camera, a depth sensor such as a light detection and ranging (lidar) sensor, an electromagnetic sensor, etc. The client device 150 may also include a network interface for communicating with devices over short-range communication links, such as Bluetooth, Wi-Fi, or NFC. The network interface may enable communication with other devices (e.g., the OLT 102, the last mile termination units 106*a*, 106*n*, the one or more servers 130, the computing device 125, etc.) via any suitable networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

Furthermore, the client device 150 may include a display. The display may be a transparent display with camera views of real-world imagery. For example, when the client device 150 is smart glasses or a virtual reality headset, the transparent display may be presented in front of the user's eyes. Then the client device 150 may present augmented reality features on the transparent display overlaying the real-world imagery to help guide the user.

Additionally and/or alternatively, the client device 150 or an optical terminal in the PON 100 may communicate with one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

In another example, the PON repair application may communicate with the server(s) 130 to transmit diagnostic information to the server(s), receive repair instructions from the server(s) 130, receive a description of an identified root cause of the network failure from the server(s), receive records of the FDHs, splitters, distribution ports, and ONTs connected to the distribution ports, transmit updated connection information regarding the ONTs and distribution ports, etc. In some implementations, the entire functionality of the PON repair application may be executed on the server(s) 130. In other implementations, the PON repair application does not communicate with a server 130 and performs its functionality locally on the client device 150. In yet other implementations, the client device 150 and the server(s) 130 each perform a portion of functionality of the PON repair application.

Various information and data associated with, utilized by, and/or generated by the PON 100 may be stored in the data stores 132 of the PON 100. For example, the data store(s) 132 may store sets of instructions for repairing LMTUs 106*a*-106*n*, 107*a*-107*m*, where each set of instructions corresponds to a different root cause of the network failure. For example, if the root cause is a broken optical fiber 112*a*, the corresponding instructions may be for replacing the optical fiber 112*a*. If the root cause is that the optical fiber 112*a* is dirty, the corresponding instructions may be for cleaning the optical fiber 112*a*. The data store(s) 132 may also store records of customer contact events with a technical support organization supporting the PON 100, service call records, records of operating conditions and events which occurred, logbooks, records of the FDHs, splitters, distribution ports, and ONTs connected to the distribution ports in the PON, and the like.

Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

The example servers 130, optical terminals (e.g., any of the OLT 102, the last mile termination units 106*a*, 106*n*), and/or the example computing devices 125, 150 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106*a*, 106*n*, the one or more servers 130, the computing device 125, the one or more data stores 132, etc., any other database, and/or any other machine).

The example processing platform includes the network interface(s) to enable communication with other machines (e.g., the OLT 102, the last mile termination units 106*a*, 106*n*, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

To connect to an LMTU 106*a* to establish a communication session between the client device 150 and the LMTU 106*a*, a user may tap the client device 150 to the LMTU 106*a* to cause the PON repair application to transmit an NFC signal to the LMTU 106*a* requesting to pair the devices. The LMTU 106*a* may receive the NFC signal and establish a communication session between the two devices 150, 106*a* in response to the request. Then the client device 150 and the LMTU 106*a* may transmit NFC communications back and forth to each other with real-time information, such as diagnostic information from the LMTU 106*a*, and control signals from the client device 150 for the LMTU 106*a* to execute diagnostic tests.

In another example, the client device 150 and the LMTU 106*a* may connect via Wi-Fi. For example, the LMTU 106*a* may broadcast a Wi-Fi signal. When the client device 150 is within communication range of the LMTU 106*a*, the PON repair application may receive the Wi-Fi signal and may request to connect to the LMTU 106*a* via the broadcasted Wi-Fi network. In some implementations, the PON repair application may provide a password for connecting to the LMTU 106*a*. The LMTU 106*a* may receive the request and establish a communication session between the two devices 150, 106*a*. In some implementations, the LMTU 106*a* may authenticate the client device 150 using the received password before establishing the communication session. Then the client device 150 and the LMTU 106*a* may transmit Wi-Fi communications back and forth to each other with real-time information, such as diagnostic information from the LMTU 106*a*, and control signals from the client device 150 for the LMTU 106*a* to execute diagnostic tests.

In some implementations, the PON repair application may store a geospatial tag indicating the location of the LMTU 106*a*. For example, the PON repair application may determine the location of the LMTU 106*a* based on the GPS location of the client device 150 while the client device 150 is connected to the LMTU 106*a*. Then when the user is at the same location at a later time, the PON repair application may automatically connect to the Wi-Fi for he LMTU 106*a*. In another example, the PON repair application may determine the location of the LMTU 106*a* based on electromagnetic (EM) data detected from the client device 150 while the client device 150 is connected to the LMTU 106*a*. The PON repair application may compare the EM data to known EM data at various locations to determine the location of the LMTU 106*a*. Still further, if the user has trouble finding the LMTU 106*a*, the PON repair application may use the stored geospatial tag to direct the user to the LMTU 106*a*.

If the user is within communication range of the LMTU 106*a*, the PON repair application may precisely locate the LMTU 106*a* relative to the user's location based on properties of the Wi-Fi signals communicated between the devices. For example, the PON repair application may determine the round trip time (RTT) it takes to transmit a message to the LMTU 106*a* and receive a response message back from the LMTU 106*a*. The PON repair application can determine the distance from the devices 150, 106*a* based on the round trip time for the communications back and forth. For example, the PON repair application can calculate the distance, D, as ½ of c×RTT, where c is the speed of light. Then the PON repair application may present an indication of the distance to the LMTU 106*a* to the user to direct the user to the LMTU 106*a*.

The PON repair application may also determine the direction in which the user needs to travel to locate the LMTU 106*a* based on the angle of arrival of communications between the client device 150 and the LMTU 106*a*. For example, the client device 150 may have multiple antennas for receiving short-range communications. The client device 150 may receive a communication from the LMTU 106*a* at each of its antennas, where the antennas are located at different positions within the client device 150. The PON repair application may then determine the angle of arrival of the communication based on a time difference at which each of the antennas received the communication. In other implementations, the LMTU 106*a* may have multiple antennas for receiving short-range communications and may determine the angle of arrival of a communication based on a time difference at which each of the antennas received the communication. In any event, the PON repair application may present an indication of the direction in which the user needs to travel to locate the LMTU 106*a* to direct the user to the LMTU 106*a*. For example, the PON repair application may present a map display with an indication of the location of the LMTU 106*a* and an indication of the location of the user relative to the LMTU 106*a*. The PON repair application may also provide navigation directions for traveling to the LMTU 106*a*, such as "Go downstairs into the basement and the LMTU 106*a* is to your left."

In other implementations, the PON repair application may determine the direction in which the user needs to travel to locate the LMTU 106*a* based on the EM data and/or accelerometer data. For example, the PON repair application may determine a change in position of the user based on the accelerometer data and/or a change in the EM data. Then the PON repair application may determine the direction in which the user is currently traveling based on the change in position and can provide directions to the LMTU 106*a* using the user's current location and their direction of travel.

In some implementations, the PON repair application may also connect to and/or receive navigation information to other optical terminals in the PON, such as an FDH 116*a*, FDT, or OLT 102.

Figure 11:
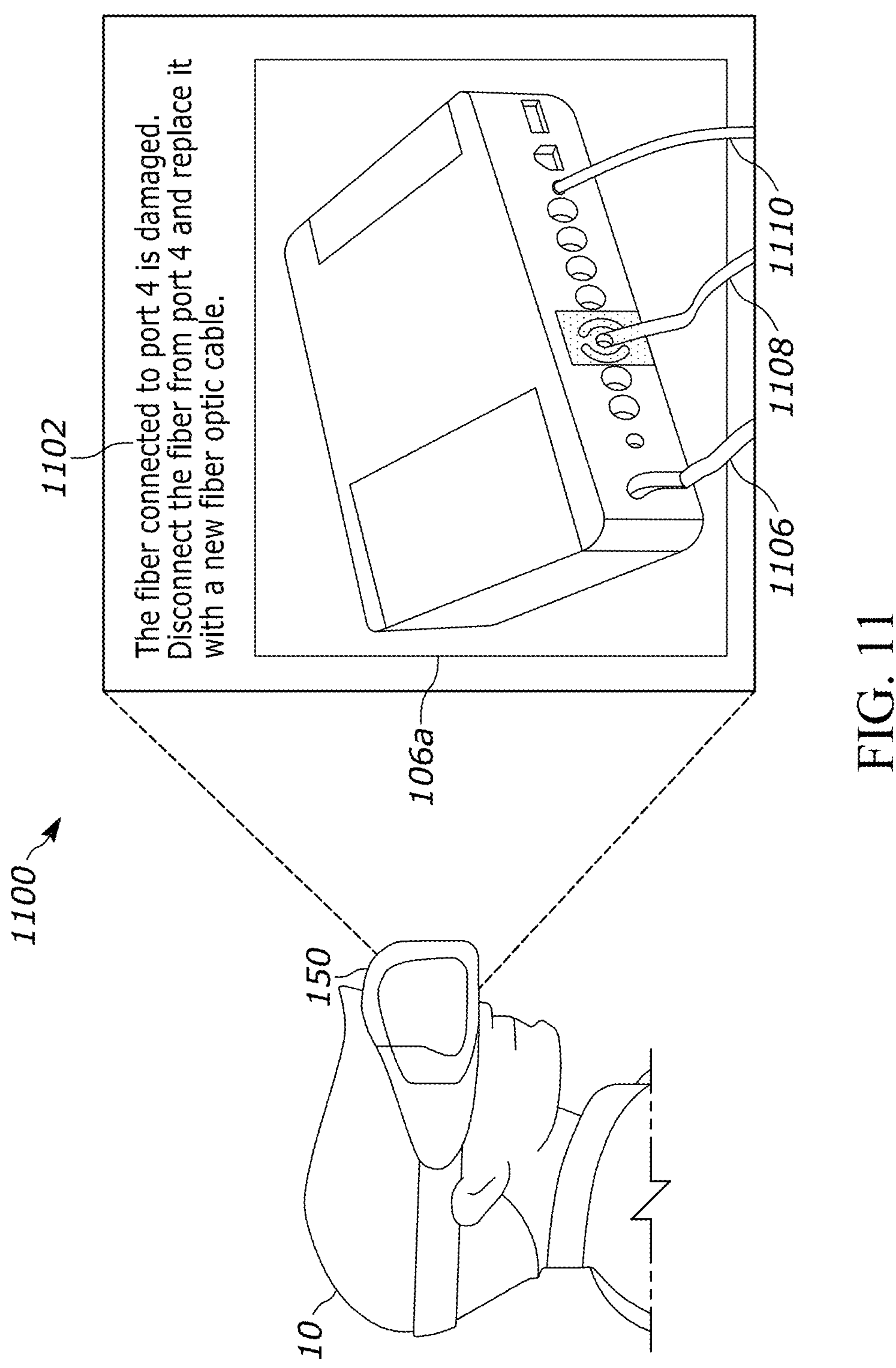
FIG. 11 illustrates an example transparent display of a client device with real-world imagery of the user's field of view which includes the particular ONT and step-by-step instructions for repairing the particular ONT overlaid on the transparent display.
Figure 12:
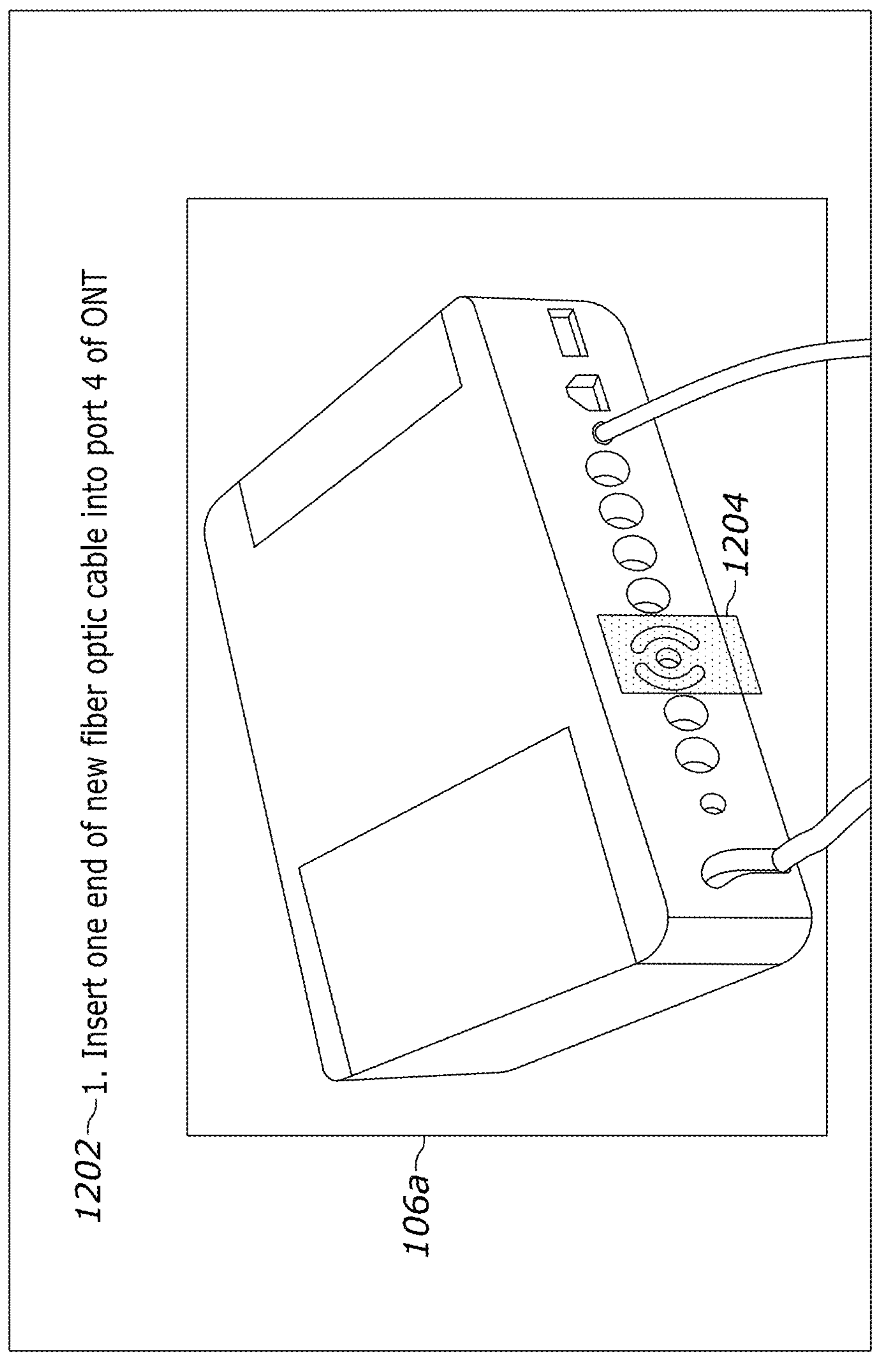
FIGS. 12 and 13 illustrate example transparent displays of the client device with real-world imagery of the user's field of view which includes the particular ONT and AR features overlaid on the transparent displays.
Figure 13:
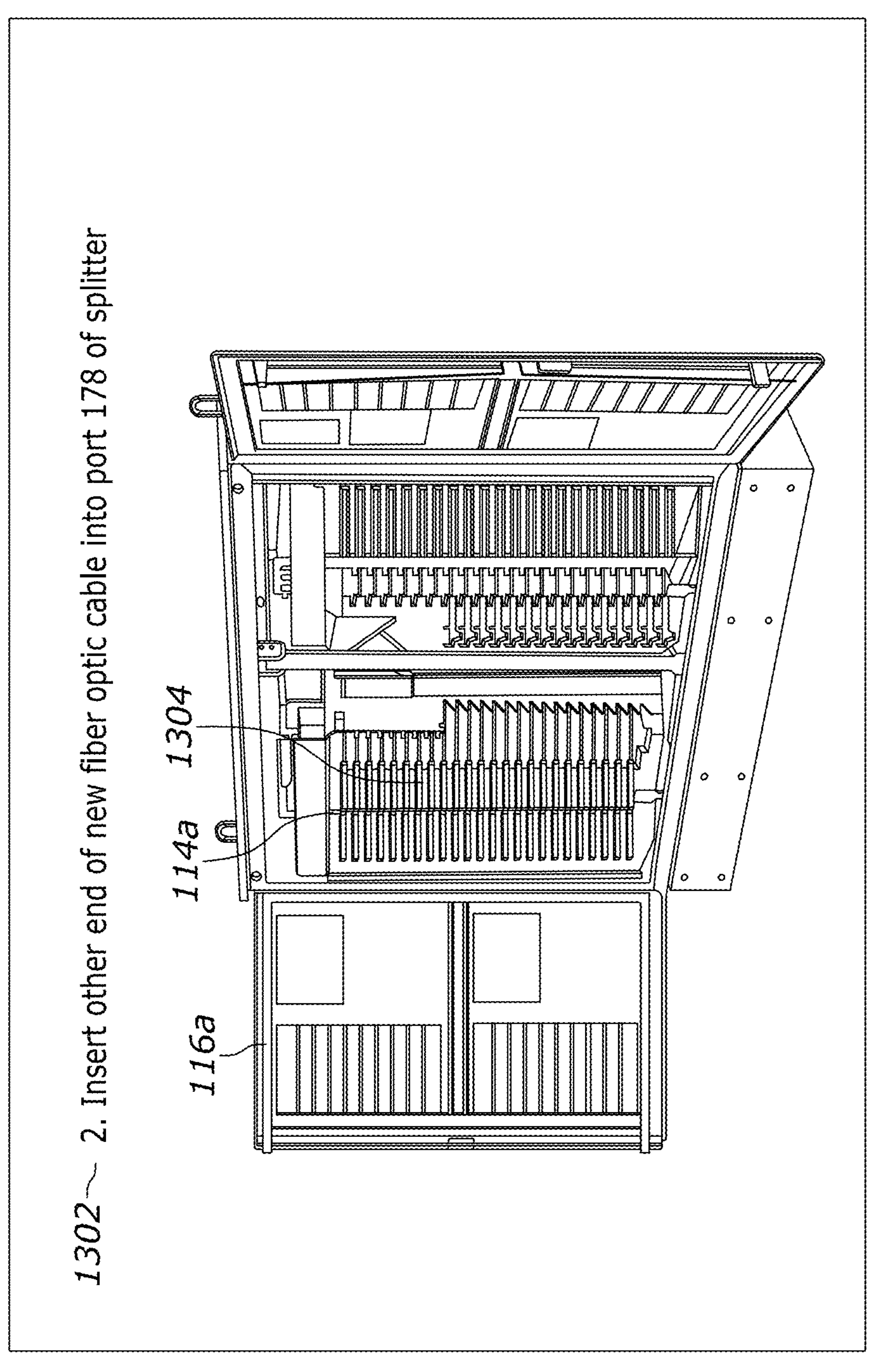

FIGS. 2A-3C illustrate example displays 200-360 for connecting to an ONT or other optical terminal which may be presented by the PON repair application on the client device 150. FIGS. 4A-6B illustrate example displays 400-650 for presenting diagnostic information and executing diagnostic tests which may be presented by the PON repair application on the client device 150. FIGS. 7-10 illustrate example displays 700-1000 for presenting splitter and distribution port information which may be presented by the PON repair application on the client device 150. FIGS. 11-13 illustrate example displays 1100-1300 for providing instructions for repairing an ONT or other optical terminal which may be presented by the PON repair application on the client device 150. The screenshots shown in FIGS. 2A-13 are examples of what may be displayed to a user. As will be appreciated by those of ordinary skill in the relevant art(s), the exemplary screenshots shown in FIGS. 2A-13 are for illustrative purposes, and their associated functionality may be implemented using any suitable format and/or design for facilitating their corresponding described functionalities without departing from the spirit and scope of the present disclosure.

Figure 2A:
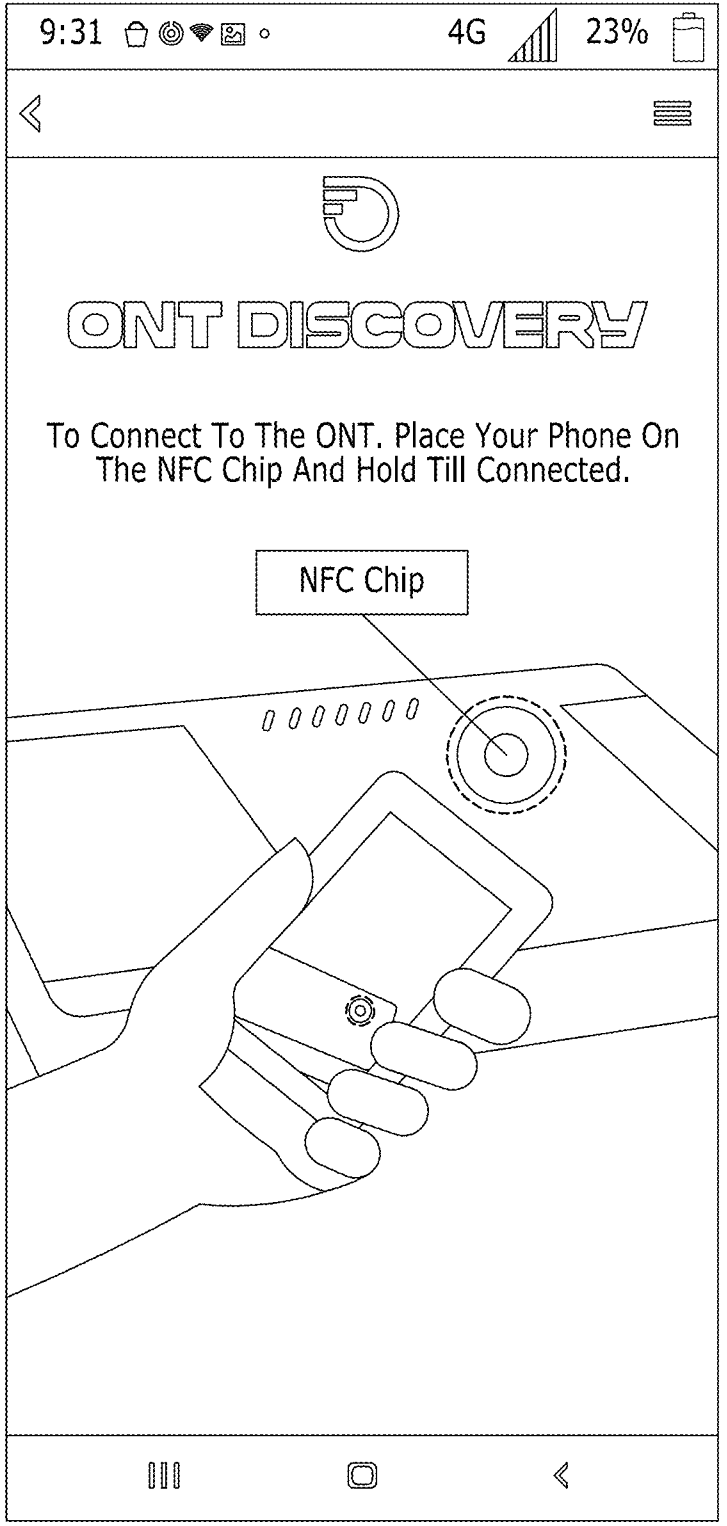
FIGS. 2A and 2B illustrate example displays of a PON repair application for connecting to a particular ONT using NFC, which may be presented on a client device.
Figure 2B:
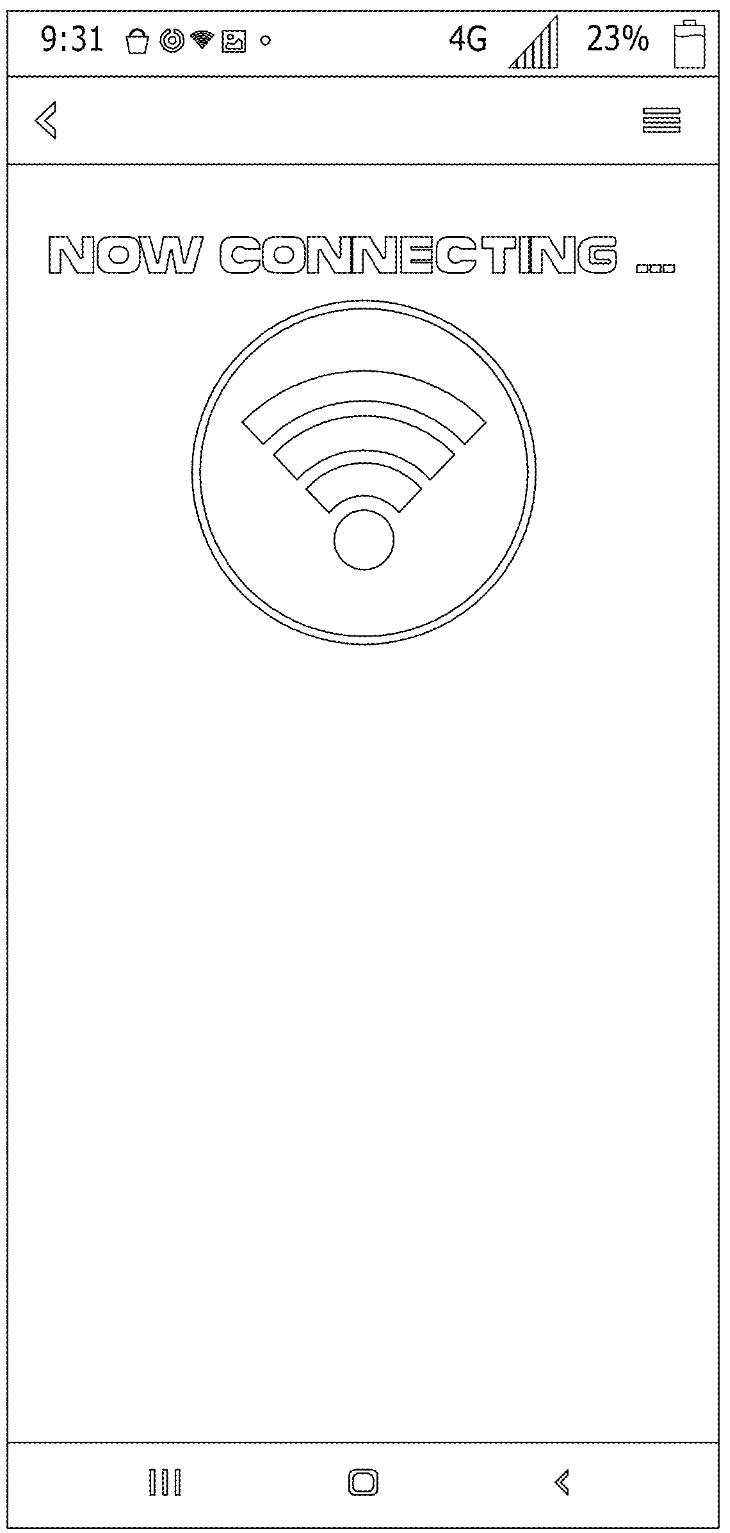

As shown in FIG. 2A, the PON repair application may present a display 200 with instructions for connecting to an ONT 106*a* using NFC. The display 200 may include instructions for connecting to the ONT 106*a* by tapping the client device 150 to an NFC chip on the ONT 106*a*. Then once the user taps the client device 150 to the ONT 106*a*, the PON repair application may present a display 250 indicating the client device 150 is connecting to the ONT 106*a*. The client device 150 may then pair with the ONT 106*a* and establish a communication session between the devices 150, 106*a*.

Additionally or alternatively, the client device 150 may connect to the ONT 106*a* using a Wi-Fi communication link. As shown in FIG. 3A, the PON repair application may present a search display 300 for searching for a Wi-Fi network for connecting to the ONT 106*a* by entering a customer identifier, an ONT serial number, or any other suitable identification information for the ONT 106*a*. A user such as a customer or a technician may enter the customer identifier or the ONT serial number in a search bar and select a user control to submit the search query. The PON repair application may then identify the ONT 106*a* based on the search query, and identify a Wi-Fi network for connecting to the ONT 106*a*. FIG. 3B illustrates an example search result display 330 indicating the Wi-Fi network 332 for connecting to the ONT 106*a* related to the search query and including a user control 334 for connecting to the Wi-Fi network. In response to receiving a selection of the user control 334 to connect to the Wi-Fi network 332, the PON repair application may automatically connect to the Wi-Fi network 332 when the client device 150 is within communication range of the Wi-Fi network. For example, once the client device 150 detects a Wi-Fi signal from the Wi-Fi network 332, the client device 150 may automatically connect to the Wi-Fi network 332.

In addition to entering identification information for the ONT 106*a* in a search bar to identify the short-range communication network for connecting to the ONT 106*a*, the ONT 106*a* may include a barcode, such as a quick response (QR) code on the surface of the ONT 106*a* with information for connecting to the short-range communication network. The client device 150 may capture an image of the barcode and analyze the image to obtain the information included in the barcode which may include the name of the Wi-Fi network, a password for connecting to the Wi-Fi network, etc.

Then once the client device 150 connects to the ONT 106*a* via a short-range communication link, the PON repair application may receive and present diagnostic information from the ONT 106*a* as shown in the diagnostic display 360 of FIG. 3C.

Figure 4A:
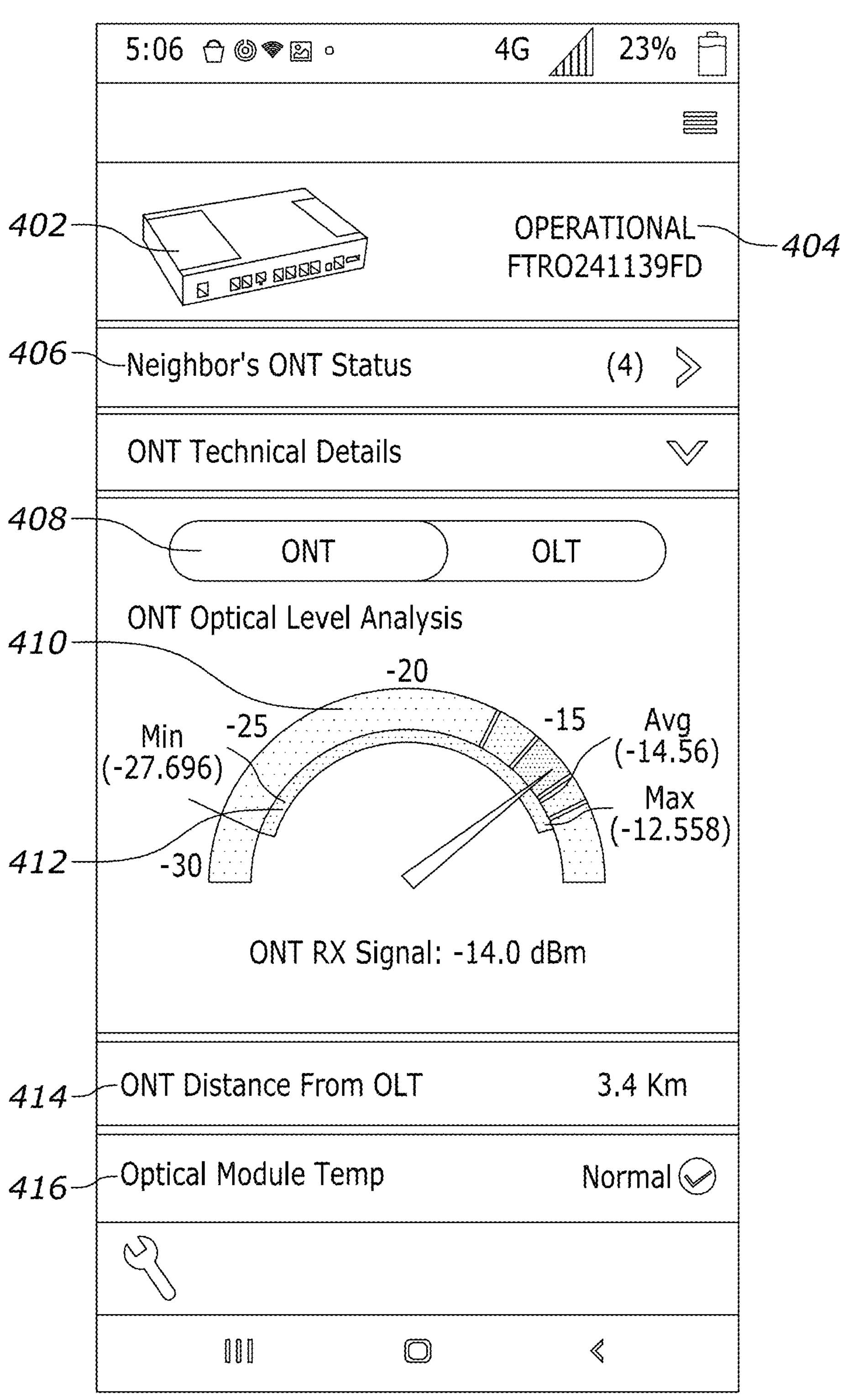
FIGS. 4A and 4B illustrate example displays of a PON repair application which include diagnostic information for the particular ONT and user controls for executing diagnostic tests on the particular ONT, which may be presented on a client device.
Figure 4B:
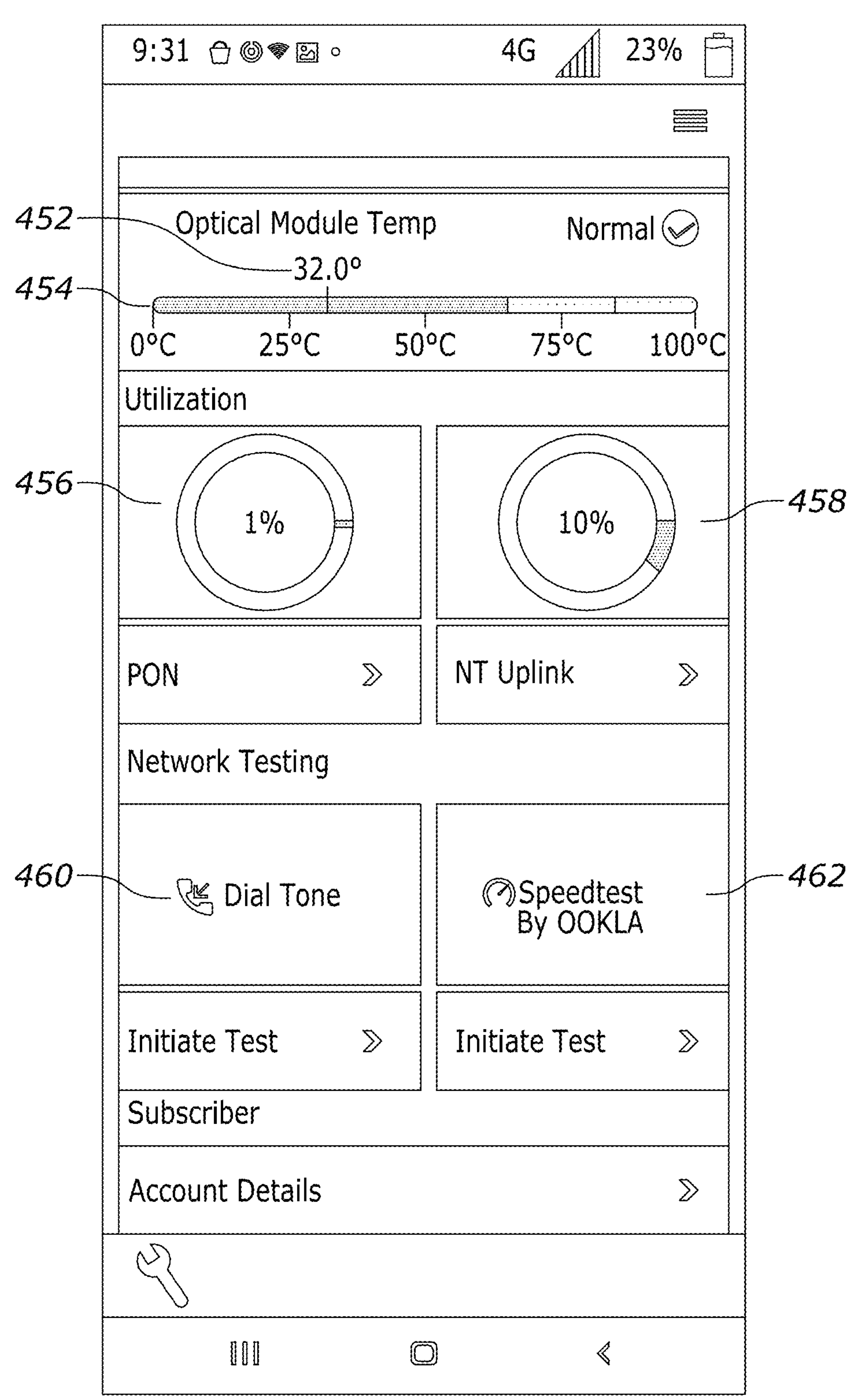

FIGS. 4A and 4B illustrate example diagnostic displays 400, 450 which may be presented by the PON repair application on the client device 150. For example, once the client device 150 connects to the ONT 106*a* via a short-range communication link, the PON repair application may receive real-time diagnostic information from the ONT 106*a*. If the client device 150 is not directly connected to the ONT 106*a*, the client device 150 may receive stored diagnostic information from the server 130 which may not be up to date. In any event, the diagnostic display 400 includes a graphic representation 402 of the ONT 106*a* and an indication of the operational status 404 of the ONT 106*a*. For example, the operational status 404 may indicate the ONT 106*a* is operational or is experiencing a failure and is unable to communicate with the OLT 102.

The diagnostic display 400 also includes an indication of statuses 406 of neighbors' ONTs. In this manner, the user may be able to determine that the ONT 106*a* is not the cause of the network failure and instead a neighbor's ONT is the cause of the network failure. Then the user may contact the neighbor to repair the neighbor's ONT.

Additionally, the diagnostic display 400 includes a user control 408 for selecting an optical terminal in which to present diagnostic information. For example, the user can select to view diagnostic information for the ONT 106*a*, the OLT 102, the FDH 116*a*, the FDT, etc. The ONT 106*a* may receive diagnostic information from the OLT 102, the FDH 116*a*, the FDT, and/or any other optical terminal and transmit the diagnostic information to the client device 150 via the short-range communication link. When the user control 408 is selected for viewing diagnostic information for the ONT 106*a*, the diagnostic display 400 presents a graphic representation 410 indicating the light level at the ONT 106*a*. The graphic representation 410 may include an indication of the ONT light level (−14.0 dBm), an indication of a minimum and maximum light level (−27.696 dBm, −12.558 dBm) for all of the ONTs on the PON, and an indication of an average light level (−14.56 dBm) for all of the ONTs on the PON. Additionally, the graphic representation 410 may include a light level meter gauge having green, yellow, and red color indicators to indicate good, fair, and poor light level ranges, respectively. Still further, the diagnostic display may include a graphic indicator 412 below the light level meter gauge 410 indicating the light level range of all ONTs within a threshold radius (e.g., 1 km) of the ONT 106*a*.

Moreover, the diagnostic display 400 may include an indication of the distance 414 from the ONT 106*a* to the OLT 102 (3.4 km) and an indication of the optical temperature 416 of the ONT 106*a* (Normal).

FIG. 4B illustrates another example diagnostic display 450 which may be presented by the PON repair application on the client device 150. For example, the diagnostic display 450 may be presented when the user scrolls down on the diagnostic display 400 of FIG. 4A. In other implementations, the diagnostic display 450 may be presented in response to receiving a selection of a user control on the diagnostic display 400 to view another page.

In any event, the diagnostic display 450 includes additional information about the optical temperature of the ONT 106*a*. More specifically, the additional information includes a temperature metric 452 (32.0°) and a graphic representation of a temperature gauge 454 having green, yellow, and red color indicators to indicate normal, hot, and very hot temperature ranges, respectively. Furthermore, the diagnostic display 450 includes utilization metrics for the ONT 106*a*. The utilization metrics include a PON utilization metric 456 (1%) and a network terminal (NT) uplink utilization metric 458 (10%).

Additionally, the diagnostic display 450 includes user controls 460, 462 for transmitting control signals to the ONT 106*a* to cause the ONT 106*a* to initiate diagnostic tests including a dial tone test 460 and a speed test 462. The client device 150 may then receive diagnostic information from the ONT 106*a* via the short-range communication link in response to the ONT 106*a* performing the diagnostic test. In response to selecting the user control 462 to initiate a speed test, the ONT 106*a* may receive the control signal from the client device 150 and begin executing a speed test to test the upload and download rates of the ONT 106*a*. Then the ONT 106*a* may transmit the results of the speed test to the client device 150 via the short-range communication link. When the user selects the user control 462 to initiate the speed test, the PON repair application may present a speed test display 500, as shown in FIG. 5.

The speed test display 500 may include a user control 502 for selecting a server for performing the speed test. Then the ONT 106*a* may perform the speed test by transmitting and receiving data to and from the selected server over the fiber optic network and determining upload and download rates of the communications with the selected server. The ONT 106*a* may provide the upload and download rates to the client device 150 via the short-range communication link. Then the speed test display 500 may present indications 504, 506 of the download and upload rates, respectively.

Figure 6A:
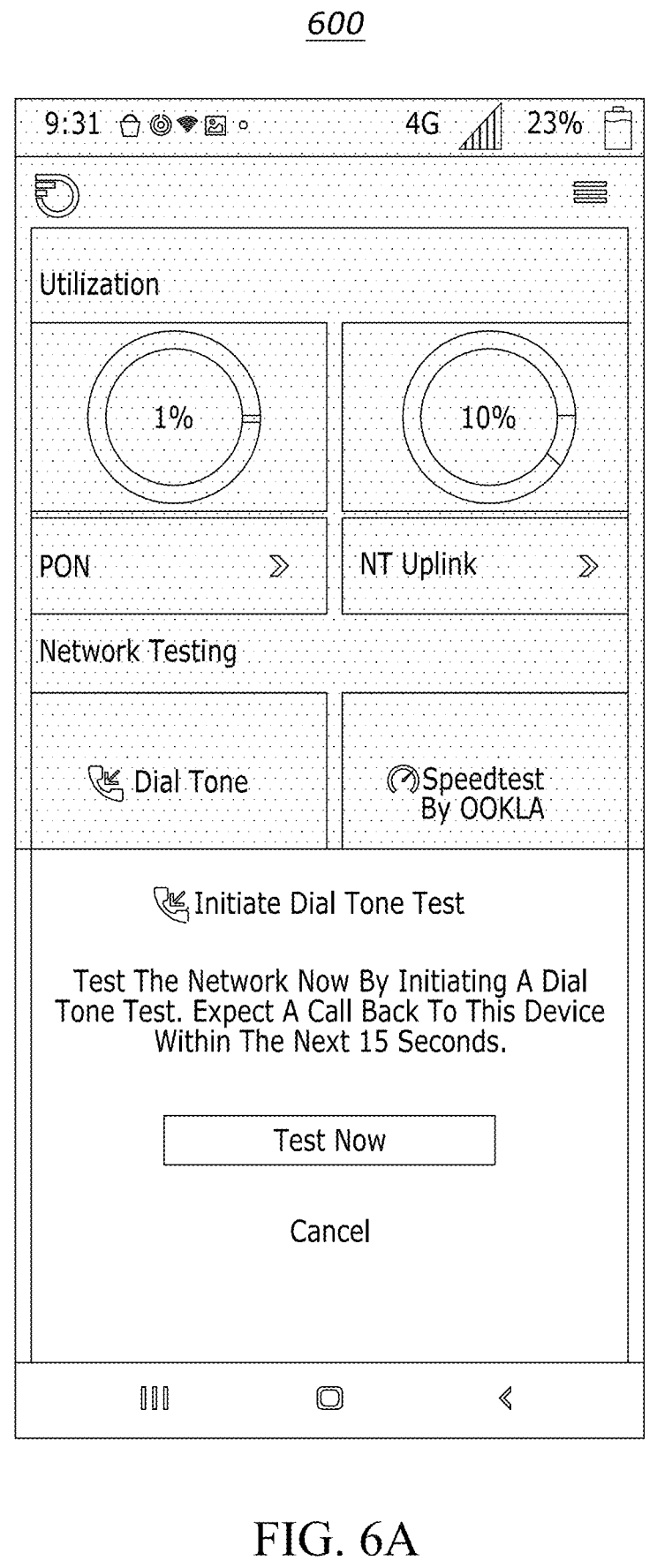

In response to selecting the user control 460 to initiate a dial tone test, the ONT 106*a* may receive a control signal from the client device 150 via the short-range communication link to call the client device 150. The client device 150 may also transmit the client device's phone number to the ONT 106*a*. Then the ONT 106*a* may begin executing the dial tone test to test whether the ONT 106*a* can successfully complete the call with the client device 150. Then the ONT 106*a* may call the client device 150 via the fiber optic network. When the user selects the user control 460 to initiate the dial tone test, the PON repair application may present a dial tone test display 600, as shown in FIG. 6A.

Figure 6B:
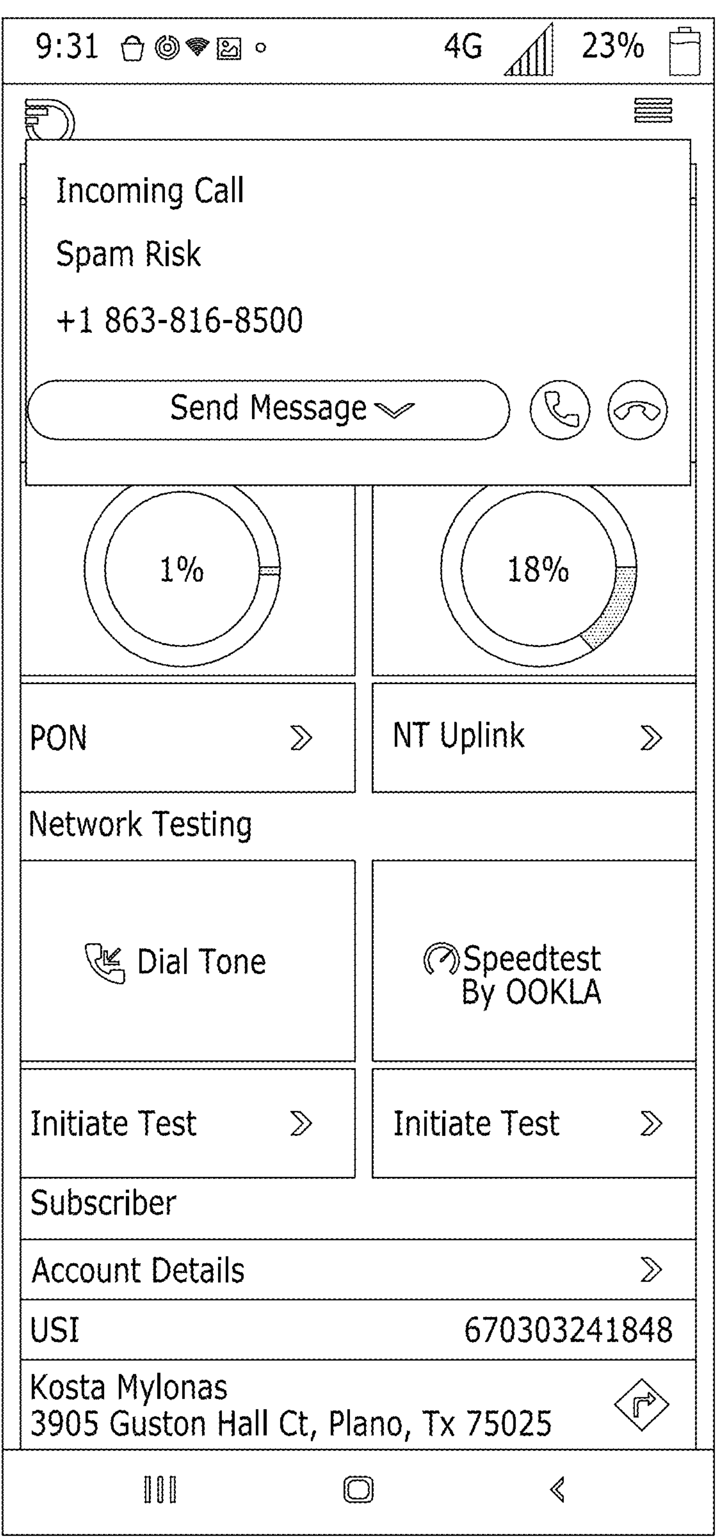

The dial tone test display 600 may include an indication that the user should expect a call back shortly. Then as shown in FIG. 6B, the client device 150 presents an indication of an incoming call for the user to accept with user controls for accepting or denying the call. The user can then determine that the ONT 106*a* passed the dial tone test by being able to initiate a call with the client device 150.

The user may use the diagnostic information from the diagnostic tests and/or from the displays 400-650 to determine the root cause of the network failure and repair or replace the ONT 106*a* or another device in the PON 100. For example, in some scenarios, the user may determine that the ONT 106*a* needs to be replaced and may swap the ONT 106*a* out with a replacement ONT. The user may also order a new ONT to be shipped to the user's residence, for example if the user is a customer and not a technician and does not have a replacement ONT.

In any event, the ONT 106*a* may transmit any suitable diagnostic information to the client device 150 via the short-range communication link which may assist the user in determining how to repair the ONT 106*a* or another device in the PON 100. The diagnostic information may include a download rate at the ONT 106*a*, an upload rate at the ONT 106*a*, a light level metric at the ONT 106, a distance from the ONT 106*a* to the OLT 102, a temperature metric at the ONT 106*a*, a PON utilization metric, an uplink metric for the ONT 106*a*, or any other suitable diagnostic information related to the ONT 106*a* and/or the PON 100. The diagnostic information may also include any suitable diagnostic information from the OLT 102, the FDH 116*a*, the FDT, or any other optical terminal in the PON 100. For example, the diagnostic information may further include diagnostic information from neighboring ONTs, so that the user can determine that a neighbor's ONT is the cause of the network failure. Then the user may contact the neighbor to repair the neighbor's ONT.

As mentioned above, the server 130 may store a record of FDHs, splitters, distribution ports, and ONTs connected to the distribution ports, for example in the data store 132. To update the record, service technicians may indicate which distribution port connects to which ONTs via the PON repair application. The PON repair application may transmit this information to the server 130, which may store updated distribution ports in association with their corresponding ONTs.

Figure 7:
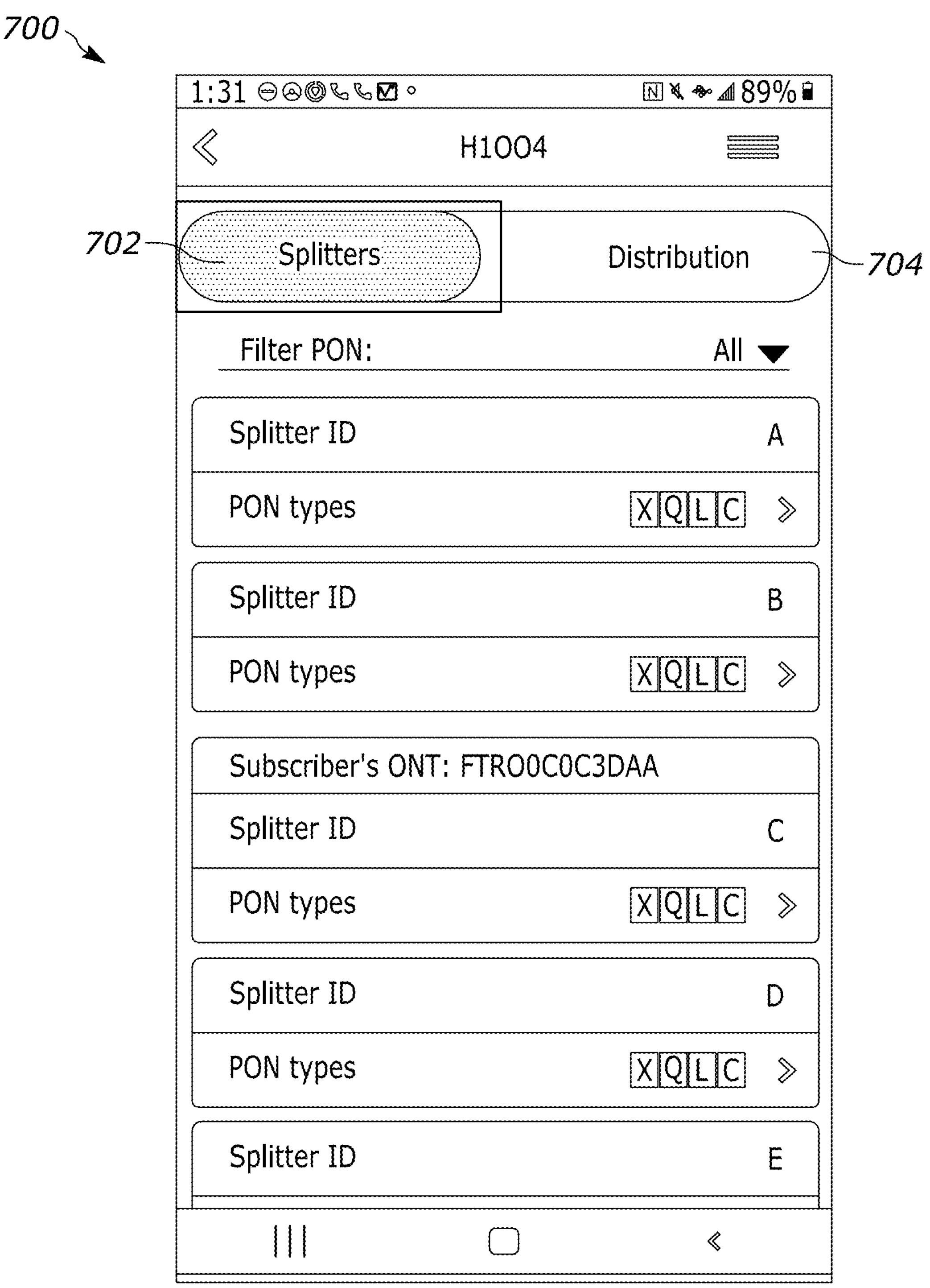
FIG. 7 illustrates an example display of a PON repair application indicating the splitters in the PON, which may be presented on a client device.

FIG. 7 illustrates an example splitter display 700 indicating the optical splitters 114*a*, 114*b* in the PON 100. For example, the splitter display 700 presents splitter identification information for each of the optical splitters, such as splitter A, splitter B, splitter C, splitter D, splitter E, etc. For a particular optical splitter (e.g., splitter A), the splitter display 700 presents the PON types or optical services provided by the particular optical splitter, such as GPON, XG-PON, 25G-PON, 50G-PON, 100G-PON, etc. Additionally, the splitter display 700 indicates which splitter is connected to the ONT 106*a* which is in communication with the client device 150 (splitter C). While only optical splitters A-E are visible on the splitter display 700, additional optical splitters may be shown on the splitter display 700 by scrolling down, for example.

Figure 8:
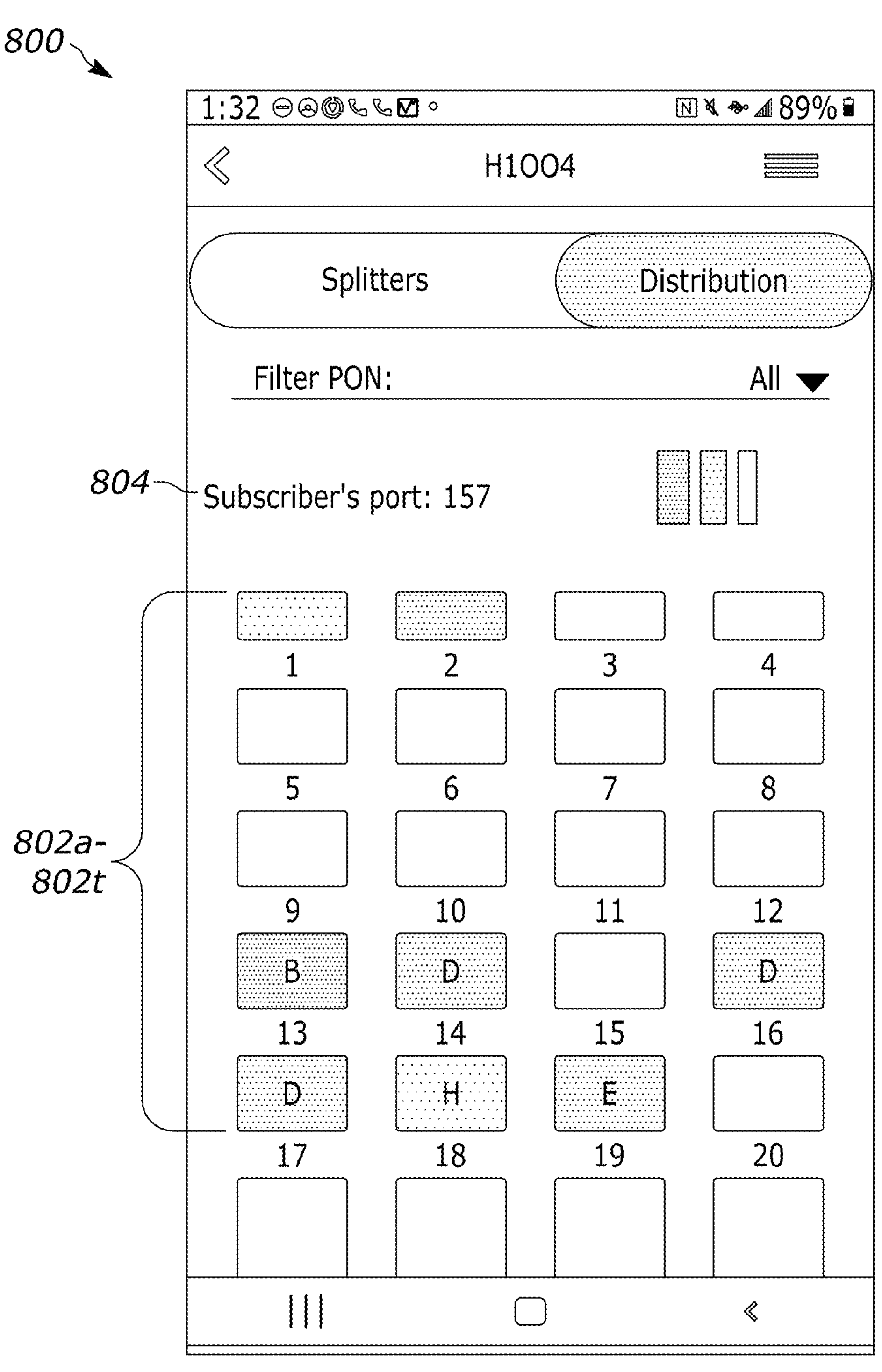
FIG. 8 illustrates an example display of a PON repair application indicating the distribution ports in the PON, which may be presented on a client device.

The splitter display 700 includes a splitter user control 702 for presenting the splitter display and a distribution user control 704 for presenting a distribution port display 800. FIG. 8 illustrates a distribution port display 800 indicating the distribution ports at the optical splitters 114*a*, 114*b* in PON 100. For example, the distribution port display 800 presents an indication of each of the distribution ports 802*a*-802*t* (distribution ports 1-20). The distribution port display 800 also presents an indication 804 of the distribution port connected to the ONT 106*a* that is in communication with the client device 150 (distribution port 157). While only distribution ports 1-20 are visible on the distribution port display 800, additional distribution ports may be shown by scrolling down, for example.

In the distribution port display 800, each distribution port is identified by its port number (e.g., 14), and includes an indication of the optical splitter 114*a*, 114*b* where the particular distribution port is located and a status of the ONT connected to the distribution port via an optical fiber 112*a*-112*n*. The status of the ONT connected to the distribution port is presented by highlighting or shading the indication of the distribution port 802*a*-802*t* in a particular color or shading. For example, when the indication of the distribution port 802*a*-802*t* is highlighted green, the distribution port is active. When the indication of the distribution port 802*a*-802*t* is highlighted green with a white border around it, the distribution port is connected to the ONT 106*a* that is in communication with the client device 150. When the indication of the distribution port 802*a*-802*t* is highlighted blue, the status of the ONT connected to the distribution port is "wire through" meaning that the service is running. When the indication of the distribution port 802*a*-802*t* is highlighted yellow, the ONT connected to the distribution port is down and not providing Internet service. When the indication of the distribution port 802*a*-802*t* is highlighted white or gray, the distribution port is vacant.

For example, distribution port 14 (ref. no. 802*n*) is located on optical splitter D and is connected to an ONT with a "wire through" status. Distribution port 5 (ref. no. 802*e*) is vacant. Distribution port 13 (ref. no. 802*m*) is located on optical splitter B and is active. In response to receiving a selection of one of the indications of the distribution ports 802*a*-802*t*, the PON repair application may present additional distribution port information in a display 900 as shown in FIG. 9. The display 900 is presented in response to the user selecting the distribution port 14 (ref. no. 802*n*). Accordingly, the display 900 presents additional distribution port information for distribution port 14 (ref. no. 802*n*). The additional distribution port information may include the distribution port information presented in the distribution port display 800, such as the number or identifier of the distribution port ("14"), the ONT status of the ONT connected to the distribution port ("Wire Through"), and a splitter identifier of the optical splitter where the distribution port is located ("D"). The additional distribution port information may also include a serial number or other identifier of the ONT connected to the distribution port (#0674368) and the fiber optic technology or service provided from the distribution port ("XPON").

In some implementations, a service technician may update the distribution port connected to the ONT 106*a*. For example, the service technician may replace an optical fiber connected to the ONT 106*a* with a new optical fiber and may connect the other end of the optical fiber to a different distribution port. In another example, the service technician may check the distribution port of the optical splitter 114*a*, 114*b* connected to the ONT 106*a* and may determine that the distribution port is different from the distribution port indicated in the PON repair application.

Figure 10:
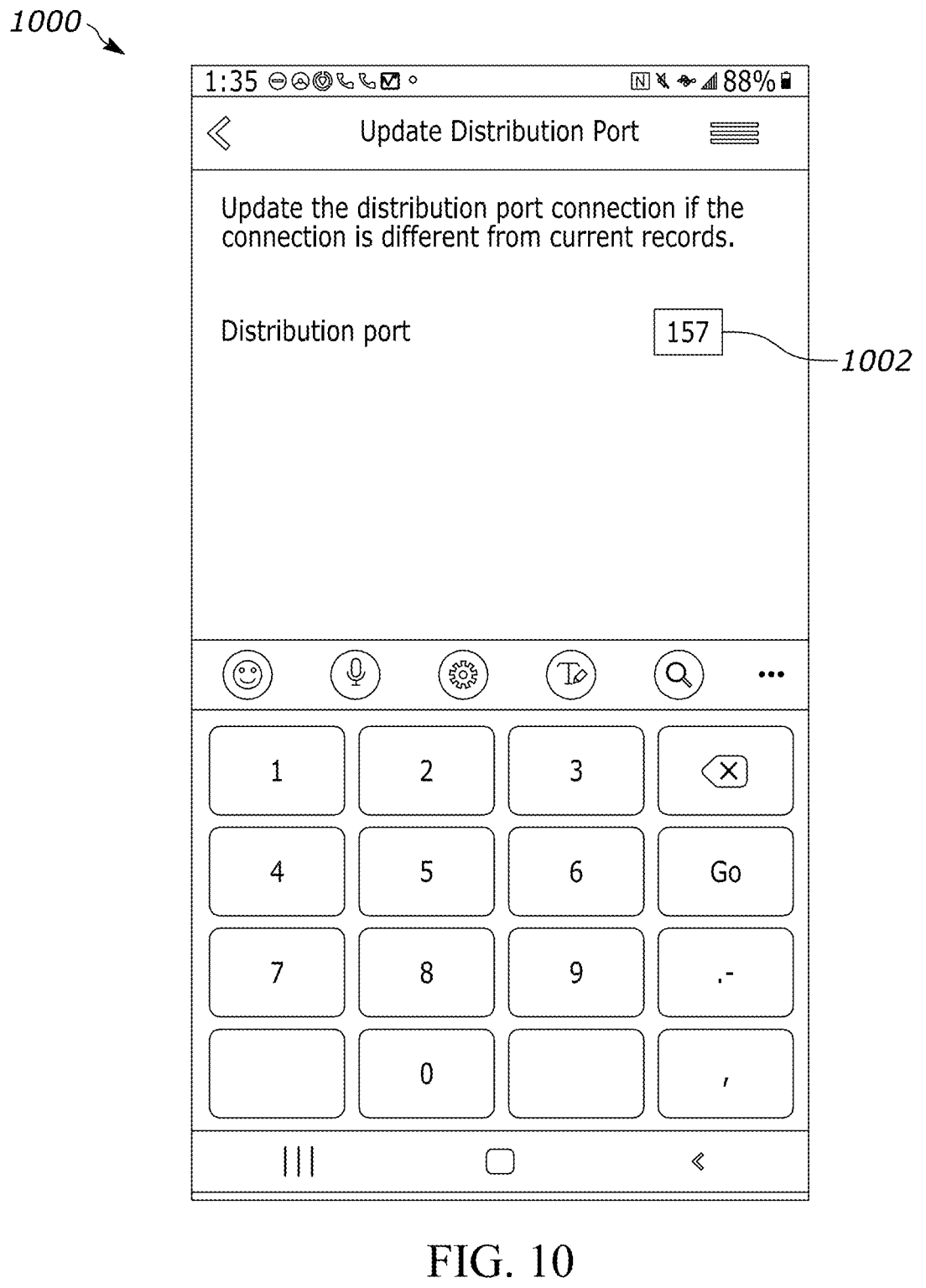

In any event, FIG. 10 illustrates an example display 1000 for updating the distribution port connected to the ONT 106*a* that is in communication with the client device 150. In other implementations, the display 1000 may allow a service technician to update the distribution port for any ONT in the PON 1000 regardless of whether the client device 150 connects to the ONT.

The display 1000 includes a user control 1002 for changing the distribution port to a different distribution port. The user control 1002 may be a free-form text field for entering in the number or identifier for the new distribution port or a drop-down menu for selecting the new distribution port from a list of the distribution ports in the PON 100. For example, the user may enter in a new distribution port connected via an optical fiber to a particular ONT by interacting with the user control 1002. The client device 150 may store the new distribution port for the ONT 106*a* and may transmit the new distribution port for the ONT 106*a* to the server 130 to update the record of record of FDHs, splitters, distribution ports, and ONTs connected to the distribution ports. Then the server 130 may store the updated record in the data store 132. When the service technician or another service technician launches the PON repair application on their client device 150, the PON repair application may receive the updated record from the server 130 and may present the displays 700-1000 according to the updated record.

The PON repair application may present the display 1000 in response to the service technician selecting a user control 804 in the distribution display 800 corresponding to the distribution port connected to the ONT 106*a* that is in communication with the client device 150. In other implementations, the PON repair application may present the display 1000 in response to the service technician selecting a user control in the display 900 corresponding to an ONT (ONT #0674368). In yet other implementations, the PON repair application may present the display 1000 in response to the service technician selecting a user control 802*a*-802*t* in the distribution display 800 corresponding to one of the distribution ports.

In addition to presenting diagnostic information, splitter information, and distribution port information on the client device 150, the PON repair application may generate and provide instructions for repairing the ONT 106*a* based on the diagnostic information, splitter information, and/or distribution port information. More specifically, the PON repair application may receive the diagnostic information from the client device 150 and may analyze the diagnostic information to determine the root cause of the network failure. Additionally, the PON repair application may receive other sensor data indicating the current environment around the ONT 106*a*. For example, the PON repair application may obtain images of the ONT 106*a* from the camera. In some scenarios such as when the client device 150 is smart glasses or a VR headset, the camera view may be same as the user's view and the PON repair application may obtain real-world images of the user's current view of optical equipment. The PON repair application may also receive infrared data via an infrared sensor at the client device 150. For example, the ONT 106*a* may transmit IR signals that indicate various issues with the ONT 106*a*.

The PON repair application may then analyze the sensor data indicating the current environment at the ONT 106*a* to determine the cause of the network failure. For example, the PON repair application may analyze the images to identify a blinking LED on the ONT. Each LED may signal a different issue and the LED may emit light with multiple blinking patterns or in multiple different colors which each signal a different issue. The PON repair application may then determine the cause of the network failure based on which LEDs are lit up, which color each LED emits, and/or which blinking pattern each LED emits (e.g., 5 consecutive blinks, two blinks followed by a 5 second pause followed by 2 more blinks, etc.). The PON repair application may analyze the images using object recognition and/or optical character recognition (OCR) techniques to identify the LEDs that are lit up and/or their blinking patterns.

More specifically, the PON repair application may analyze a portion (also referred to herein as an "object") of an image and identify features of the object within the image, such as the geometry of the edges of the object, and RGB pixel values or colors within the object.

These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

In any event, the PON repair application may compare the features identified for the object to features from template objects (also referred to herein as "template features") using image classification and/or machine learning techniques, where the template objects may include optical terminals or components of optical terminals, such as LEDs on an optical terminal, ports, fibers connected to the optical terminal, etc. The machine learning techniques may include linear regression, polynomial regression, logistic regression, random forests, boosting, nearest neighbors, Bayesian networks, neural networks, support vector machines, or any other suitable machine learning technique. The template objects may also include other representations which are not of optical terminals. Then each of these template features may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of the object, and RGB pixel values for the object. The numerical representations of the features or feature vectors of the object may be compared to the feature vectors of template objects to determine a vector distance between the features of the object and each template object. The PON repair application may then identify the object based on the amount of similarity, or the vector distance in the nearest neighbors algorithm, between the features for the object and the features for template objects. If the closest template objects represent an LED, the object is identified as an LED. If the closest template objects represent an ONT, the object is identified as an ONT. Additionally, if the closest template objects represent a fiber, the object is identified as a fiber.

In any event, the PON repair application may identify an LED in an image and identify the signal to which the LED corresponds based on the shape of the LED or based on text which is adjacent to the LED. For example, if the text is "Power," the PON repair application may determine that the LED represents a power signal and if the LED is off, the PON repair application may determine that the power is off for the ONT 106*a*. Additionally, if the text is "Service," the PON repair application may determine that the LED represents an Internet service signal. If the LED is off, the PON repair application may determine that the ONT 106*a* is not connected to an Internet service provider.

In another example, the PON repair application may analyze the images to determine that a fiber is bent. For example, the PON repair application may identify the fiber using the objection recognition techniques described above. The PON repair application may then determine the geometry of the identified fiber and if the fiber curves at an angle which is more than a threshold angle (e.g., 45 degrees), the PON repair application may determine that the fiber is bent. In yet another example, the PON repair application may determine that the fiber is dirty, for example based on the colors of the fiber or based on the ONT 106*a* detecting Rayleigh scattering in the fiber according to attenuation in the detected light level. In another example, the PON repair application may determine that the fiber is broken by detecting cracks or breaks in the fiber.

The PON repair application may also analyze the diagnostic information from the ONT 106*a* and/or other sensor data to determine that the fiber is broken or bent. In other implementations, the PON repair application may analyze the diagnostic information and/or other sensor data to determine that the fiber is the cause of the network failure. Then the PON repair application may instruct the user to look at the fiber to determine whether the fiber is broken, bent, or dirty and to repair the ONT 106*a* accordingly based on the user's findings.

In addition to identifying issues with the fiber, the PON repair application may analyze the diagnostic information from the ONT 106*a* and/or other sensor data to determine that the ONT 106*a* needs to be replaced, that the ONT 106*a* needs to be reset (e.g., by turning the power on and off), that an outlet powering the ONT 106*a* needs to be reset, that an Ethernet cable connected to the ONT 106*a* needs to be replaced, that an optical splitter needs to be replaced 114*a*, etc.

Then in response to determining the cause of the network failure, the PON repair application may generate and provide instructions for repairing the ONT 106*a*. For example, when a fiber is bent, the PON repair application may generate instructions to straighten out the fiber. When the fiber is dirty, the PON repair application may generate instructions for cleaning the fiber. When the fiber is broken, the PON repair application may generate instructions for replacing the fiber with another fiber. In another example, when the ONT 106*a* needs to be reset, the PON repair application may generate instructions for resetting the ONT 106*a*. When the ONT 106*a* is not receiving power from the outlet, the PON repair application may generate instructions for resetting the outlet to the ONT 106*a*. Furthermore, when the ONT 106*a* needs to be replaced, the PON repair application may generate instructions for removing the current ONT 106*a* and installing a new ONT.

While these are a few examples of the causes of network failures and corresponding instructions for repairing the network failures, the PON repair application may identify any suitable cause of a network failure and generate corresponding instructions for repairing the network failure according to the identified cause.

In any event, the PON repair application may then present the instructions to the user for example, as step-by-step instructions as the user repairs the ONT 106*a*. The PON repair application may present the instructions audibly via a speaker of the client device 150 or visually on a display. In some scenarios, the PON repair application may transition to an augmented reality mode that presents real-world imagery on a transparent display in the field of view of the client device 150, and more specifically the camera view of the camera. The real-world imagery may be the user's view of the area in front of them so that they may view the instructions as they are repairing the ONT 106*a* or the FDH 116*a*. In some implementations, the PON repair application may overlay the instructions on the transparent display in a display area within the transparent display that does not obstruct the user's view of the ONT 106*a* or the FDH 116*a*. The PON repair application may identify the ONT 106*a* or the FDH 116*a* within the real-world imagery using the object recognition techniques described above. Then the PON repair application may identify a display area within the real-world imagery that does not obstruct the ONT 106*a* or the FDH 116*a*. For example, the display area may be above, below, to the left, or to the right of the ONT 106*a* or the FDH 116*a*. The PON repair application may overlay the instructions on the real-world imagery within the identified display area.

In this manner, when the client device 150 is smart glasses or a VR headset, the user may look at the ONT 106*a* or the FDH 116*a* and see instructions for repairing the ONT 106*a* or the FDH 116*a* in their field of view as they repair the ONT 106*a* or the FDH 116*a*. When the client device 150 is a tablet or smart phone, the user may also be able to hold their tablet or smart phone up to the ONT 106*a* or the FDH 116*a* and see the instructions for repairing the ONT 106*a* or the FDH 116*a*.

In addition to overlaying text instructions on the real-world imagery in the augmented reality mode, the PON repair application may overlay augmented reality features on the real-world imagery to assist the user in repairing the ONT 106*a* or other optical terminal, such as graphics or icons which highlight portions of the real-world imagery. For example, when the instructions are to examine a particular fiber, the PON repair application may identify the location of the particular fiber within the real-world imagery using the object recognition techniques described above. For example, the PON repair application may identify the fiber and identify the pixel coordinates of the fiber within the real-world imagery. Then the PON repair application may overlay a graphic at the identified location for the fiber to highlight the fiber relative to other objects within the image. For example, the graphic may be the same size and shape as the fiber in a bright yellow color, so that the fiber appears bright yellow and is easily noticeable by the user.

More generally, the PON repair application may identify location(s) within the real-world imagery for the user to view and may overlay augmented reality feature(s) at those location(s). FIG. 11 illustrates an example transparent display 1100 of a client device 150 with real-world imagery in the field of view of a user 10, where the PON repair application is in an augmented reality mode. The real-world imagery includes the ONT 106*a*. Additionally, the transparent display includes a set of step-by-step instructions 1102 for repairing the ONT 106*a* in a text format. The set of step-by-step instructions 1102 are presented within a display area which does not obstruct the ONT 106*a*. In this manner, the user may view and repair the ONT 106*a* while viewing the instructions 1102.

The real-world imagery also includes a power cord 1106 connected to a power outlet for the ONT 106*a*, and two optical fibers 1108, 1110 connected to ports 4 and 8 of the ONT 106*a*, respectively. The instructions 1102 are to disconnect the fiber 1108 from port 4 and replace it with a new fiber optic cable. The new fiber optic cable may be inserted into a different distribution port than the previous fiber optic cable, and the service technician may enter in the different distribution port in the PON repair application to update the record.

In some implementations, the transparent display may present one instruction at a time and present a new instruction once the previous instruction has been completed. FIG. 12 illustrates an example transparent display 1200 of the client device 150 with real-world imagery of the user's field of view. The transparent display 1200 includes a first instruction 1202 for repairing the ONT 106*a* which is to insert one end of the new fiber optic cable into port 4 of the ONT 106*a*. To assist the user in identifying port 4, the PON repair application overlays a first augmented reality feature 1204 over port 4. While the augmented reality feature 1204 is depicted as a semi-transparent rectangular shape, the augmented reality features may be any suitable size, shape, or color to highlight or assist the user in viewing a particular portion of the real-world imagery.

In any event, in response to determining that the first instruction 1202 has been completed, for example by analyzing updated real-world imagery to determine that one end of the fiber optic cable has been inserted into port 4 of the ONT 106*a*, the transparent display 1200 may present a second instruction 1302 and/or overlay new AR features for the second instruction 1302. In other implementations, the user may select a user control to indicate that the instruction has been completed. FIG. 13 illustrates another example transparent display 1300 of the client device 150 with updated real-world imagery of the user's field of view. The transparent display 1300 includes a second instruction 1302 for repairing the ONT 106*a* which is to insert the other end of the new fiber optic cable into distribution port 178 of the optical splitter 114*a* in the FDH 116*a* associated with the ONT 106*a*. To assist the user in identifying distribution port 178, the PON repair application overlays an augmented reality feature 1304 over distribution port 178. The augmented reality feature 1304 may be the same augmented reality feature 1204 overlayed over port 4 for the first instruction 1202 or may be a different augmented reality feature.

Figure 14:
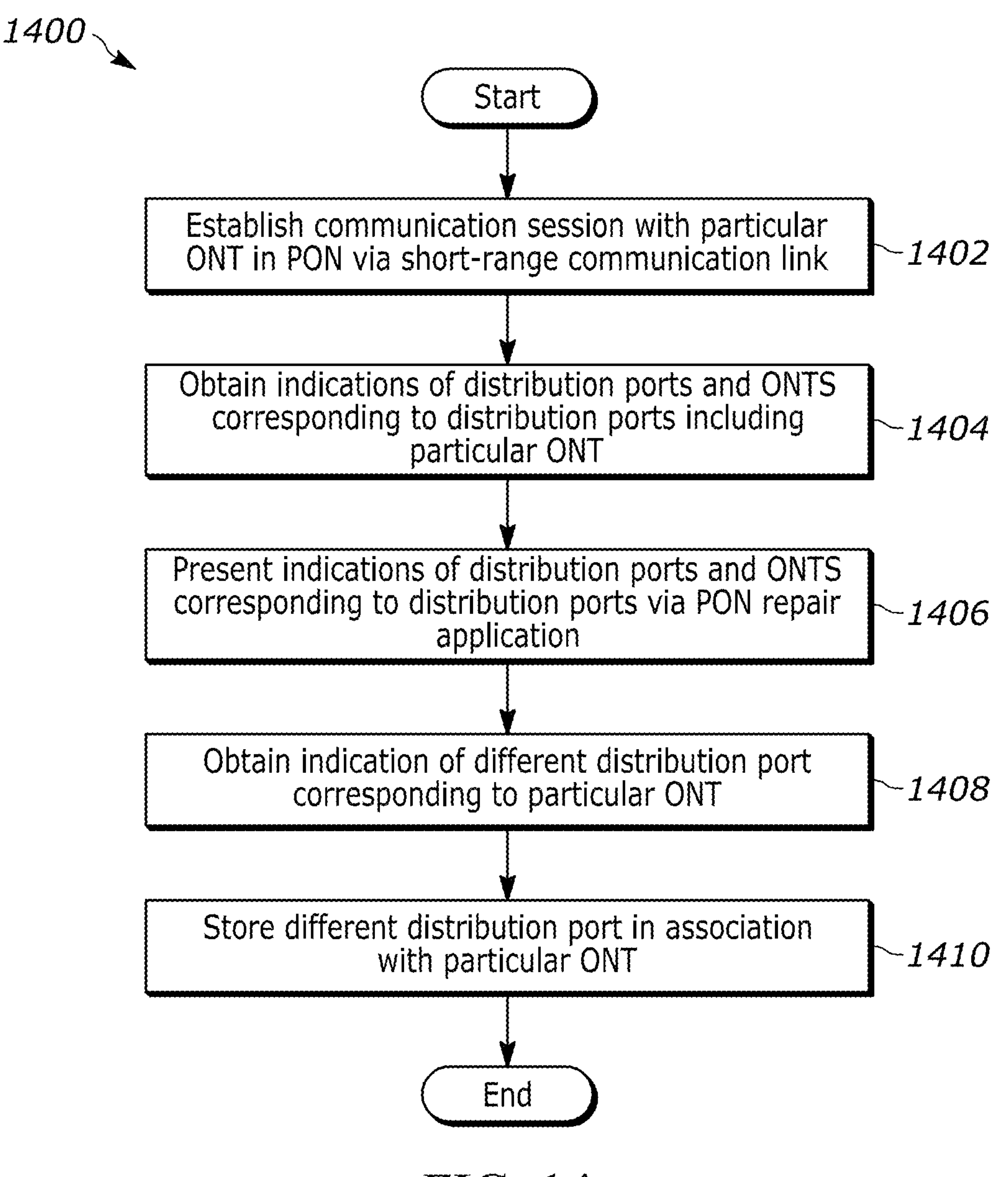
FIG. 14 is a flowchart representative of an example method for identifying connected ports in a PON, which may be performed by a client device of FIG. 1.

FIG. 14 depicts a flow diagram of an example method 1400 for identifying connected ports in a PON 100. The method 1400 may be performed by the client device 150. At block 1402, the client device 150 establishes a communication session with a particular ONT 106*a* via a short-range communication link. For example, the client device 150 and the particular ONT 106*a* may connect using Wi-Fi, Bluetooth, or NFC. More specifically, a user may tap the client device 150 to the particular ONT 106*a* to cause the PON repair application to transmit an NFC signal to the particular ONT 106_a_ requesting to pair the devices. The particular ONT 106_a_ may receive the NFC signal and establish a communication session between the two devices 150, 106_a_ in response to the request. In another example, the particular ONT 106_a_ may broadcast a Wi-Fi signal. When the client device 150 is within communication range of the particular ONT 106_a_, the PON repair application may receive the Wi-Fi signal and may request to connect to the particular ONT 106_a_ via the broadcasted Wi-Fi network.

At block 1404, the client device 150 obtains indications of distribution ports in the PON 1000 and ONTs 106_a_-106_n_, 107_a_-107_m_ corresponding to the distribution ports. The ONTs 106_a_-106_n_, 107_a_-107_m_ include the particular ONT 106_a_ which is in communication with the client device 150. For example, the server 130 may provide a record of FDHs, splitters, distribution ports, and ONTs106_a_-106_n_, 107_a_-107_m_ connected to the distribution ports to the client device 150.

The client device 150 presents the indications of distribution ports in the PON 1000 and ONTs 106_a_-106_n_, 107_a_-107_m_ corresponding to the distribution ports, for example via the PON repair application (block 1406). More specifically, the client device 150 may present a distribution display 800 as shown in FIG. 8 which indicates the distribution ports 802_a_-802_t_ in the PON 100. In response to receiving a selection of a user control for one of the distribution ports 802_a_-802_t_, the client device 150 may present a display 900 as shown in FIG. 9 with additional distribution port information, including identification information for the ONT connected to the distribution port.

At block 1408, the client device 150 obtains an indication of a different distribution port corresponding to the particular ONT 106_a_, for example via the PON repair application. More specifically, the PON repair application may present a display, such as the display 1000 shown in FIG. 10 which includes a user control for changing the distribution port to a different distribution port. For example, the service technician may change the distribution port associated with the particular ONT 106_a_ in the PON repair application when the service technician replaces an optical fiber connected to the particular ONT 106_a_ with a new optical fiber and connects the other end of the new optical fiber to a different distribution port. In another example, the service technician may change the distribution port associated with the particular ONT 106_a_ in the PON repair application when the service technician checks the distribution port of the optical splitter 114_a_, 114_b_ connected to the particular ONT 106_a_ and determines that the distribution port is different from the distribution port indicated in the PON repair application.

Then the client device 150 may store the different distribution port in association with the particular ONT 106_a_ (block 1410). For example, the client device 150 may store the different distribution port for the ONT 106_a_ and may transmit the different distribution port for the ONT 106_a_ to the server 130 to update the record of FDHs, splitters, distribution ports, and ONTs connected to the distribution ports. Then the server 130 may store the updated record in the data store 132.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method for identifying connected ports in a Passive Optical Network (PON), the method comprising: establishing a communication session, by a client device via a short-range communication link, with a particular optical network terminal (ONT) in a PON, wherein the PON includes an optical line terminal (OLT) optically connected to the ONT via one or more optical fibers and a distribution port; obtaining, by the client device, indications of a plurality of distribution ports in the PON and a plurality of ONTs corresponding to the plurality of distribution ports, wherein the plurality of ONTs include the particular ONT which is in communication with the client device; presenting, by the client device via a PON repair application, the indications of the plurality of distribution ports in the PON and the plurality of ONTs corresponding to the plurality of distribution ports; obtaining, by the client device via the PON repair application, an indication of a different distribution port corresponding to the particular ONT; and storing, by the client device via the PON repair application, the different distribution port in association with the particular ONT.

2. The method of example 1, wherein presenting the indications of the plurality of distribution ports in the PON and the plurality of ONTs corresponding to the plurality of distribution ports includes: highlighting, by the client device via the PON repair application, an indication of the distribution port corresponding to the particular ONT.

3. The method of example 1 or example 2, wherein the OLT is optically connected to one or more fiber distribution hubs having one or more splitters, each of the one or more splitters having a subset of the plurality of distribution ports for connecting to a subset of the plurality of ONTs.

4. The method of any of the preceding examples, further comprising: for the plurality of distribution ports, presenting, by the client device via the PON repair application, an indication of a splitter that houses the distribution port and an indication of one of the plurality of ONTs that connects to the distribution port via an optical fiber.

5. The method of any of the preceding examples, further comprising: presenting, by the client device via the PON repair application, a user control for changing the distribution port corresponding to the particular ONT which is in communication with the client device, wherein obtaining the indication of the different distribution port corresponding to the particular ONT includes receiving, by the client device via the PON repair application, the indication of the different distribution port based on an interaction with the user control.

6. The method of any of the preceding examples, further comprising: providing, by the client device, a set of instructions for a user to follow to repair the particular ONT including an instruction to reconnect the particular ONT to the different distribution port.

7. The method of any of the preceding examples, further comprising: providing, by the client device, one or more augmented reality features overlaid on the different distribution port for connecting an optical fiber connected to the particular ONT.

8. The method of any of the preceding examples, further comprising: presenting, by the client device via the PON repair application, a splitter display indicating each of a plurality of splitters in the PON and an indication of a particular splitter coupled to the particular ONT via an optical fiber.

9. A client device for identifying connected ports in a Passive Optical Network (PON), the client device comprising: one or more processors; a non-transitory computer-readable memory storing instructions thereon that, when executed by the one or more processors, cause the client device to: establish a communication session, via a short-range communication link, with a particular optical network terminal (ONT) in a PON, wherein the PON includes an optical line terminal (OLT) optically connected to the ONT via one or more optical fibers and a distribution port; obtain indications of a plurality of distribution ports in the PON and a plurality of ONTs corresponding to the plurality of distribution ports, wherein the plurality of ONTs include the particular ONT which is in communication with the client device; present, via a PON repair application, the indications of the plurality of distribution ports in the PON and the plurality of ONTs corresponding to the plurality of distribution ports; obtain, via the PON repair application, an indication of a different distribution port corresponding to the particular ONT; and store, via the PON repair application, the different distribution port in association with the particular ONT.

10. The client device of example 9, wherein to present the indications of the plurality of distribution ports in the PON and the plurality of ONTs corresponding to the plurality of distribution ports, the instructions cause the client device to: highlight, via the PON repair application, an indication of the distribution port corresponding to the particular ONT.

11. The client device of example 9 or example 10, wherein the OLT is optically connected to one or more fiber distribution hubs having one or more splitters, each of the one or more splitters having a subset of the plurality of distribution ports for connecting to a subset of the plurality of ONTs.

12. The client device of any of examples 9 to 11, wherein the instructions further cause the client device to: for the plurality of distribution ports, present, via the PON repair application, an indication of a splitter that houses the distribution port and an indication of one of the plurality of ONTs that connects to the distribution port via an optical fiber.

13. The client device of any of examples 9 to 12, wherein the instructions further cause the client device to: present, via the PON repair application, a user control for changing the distribution port corresponding to the particular ONT which is in communication with the client device, wherein to obtain the indication of the different distribution port corresponding to the particular ONT, the instructions cause the client device to receive, via the PON repair application, the indication of the different distribution port based on an interaction with the user control.

14. The client device of any of examples 9 to 13, wherein the instructions further cause the client device to: provide a set of instructions for a user to follow to repair the particular ONT including an instruction to reconnect the particular ONT to the different distribution port.

15. The client device of any of examples 9 to 14, wherein the instructions further cause the client device to: provide one or more augmented reality features overlaid on the different distribution port for connecting an optical fiber connected to the particular ONT.

16. The client device of any of examples 9 to 15, wherein the instructions further cause the client device to: present, via the PON repair application, a splitter display indicating each of a plurality of splitters in the PON and an indication of a particular splitter coupled to the particular ONT via an optical fiber.

17. A non-transitory computer-readable memory storing instructions thereon that, when executed by one or more processors, cause the one or more processors to: establish a communication session, via a short-range communication link, with a particular optical network terminal (ONT) in a PON, wherein the PON includes an optical line terminal (OLT) optically connected to the ONT via one or more optical fibers and a distribution port; obtain indications of a plurality of distribution ports in the PON and a plurality of ONTs corresponding to the plurality of distribution ports, wherein the plurality of ONTs include the particular ONT which is in communication with the one or more processors in a client device; present, via a PON repair application, the indications of the plurality of distribution ports in the PON and the plurality of ONTs corresponding to the plurality of distribution ports; obtain, via the PON repair application, an indication of a different distribution port corresponding to the particular ONT; and store, via the PON repair application, the different distribution port in association with the particular ONT.

18. The non-transitory computer-readable memory of example 17, wherein to present the indications of the plurality of distribution ports in the PON and the plurality of ONTs corresponding to the plurality of distribution ports, the instructions cause the one or more processors to: highlight, via the PON repair application, an indication of the distribution port corresponding to the particular ONT.

19. The non-transitory computer-readable memory of example 17 or example 18, wherein the OLT is optically connected to one or more fiber distribution hubs having one or more splitters, each of the one or more splitters having a subset of the plurality of distribution ports for connecting to a subset of the plurality of ONTs.

20. The non-transitory computer-readable memory of any of examples 17 to 19, wherein the instructions further cause the one or more processors to: for the plurality of distribution ports, present, via the PON repair application, an indication of a splitter that houses the distribution port and an indication of one of the plurality of ONTs that connects to the distribution port via an optical fiber.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for identifying connected ports in a Passive Optical Network (PON), the method comprising:

establishing a communication session, by a client device via a short-range communication link, with a particular optical network terminal (ONT) in a PON, wherein the PON includes an optical line terminal (OLT) optically connected to the ONT via one or more optical fibers and a distribution port;

obtaining, by the client device, indications of a plurality of distribution ports in the PON and a plurality of ONTs corresponding to the plurality of distribution ports, wherein the plurality of ONTs include the particular ONT which is in communication with the client device;

presenting, by the client device via a PON repair application, the indications of the plurality of distribution ports in the PON and the plurality of ONTs corresponding to the plurality of distribution ports;

obtaining, by the client device via a user control presented on the PON repair application, an indication of a different distribution port corresponding to the particular ONT; and storing, by the client device via the PON repair application, the different distribution port in association with the particular ONT.

2. The method of claim 1, wherein presenting the indications of the plurality of distribution ports in the PON and the plurality of ONTs corresponding to the plurality of distribution ports includes:

highlighting, by the client device via the PON repair application, an indication of the distribution port corresponding to the particular ONT.

3. The method of claim 1, wherein the OLT is optically connected to one or more fiber distribution hubs having one or more splitters, each of the one or more splitters having a subset of the plurality of distribution ports for connecting to a subset of the plurality of ONTs.

4. The method of claim 3, further comprising:

for the plurality of distribution ports, presenting, by the client device via the PON repair application, an indication of a splitter that houses the distribution port and an indication of one of the plurality of ONTs that connects to the distribution port via an optical fiber.

5. The method of claim 1, further comprising:

presenting, by the client device via the PON repair application, the user control for changing the distribution port corresponding to the particular ONT which is in communication with the client device.

6. The method of claim 1, further comprising:

providing, by the client device, a set of instructions for a user to follow to repair the particular ONT including an instruction to reconnect the particular ONT to the different distribution port.

7. The method of claim 6, further comprising:

providing, by the client device, one or more augmented reality features overlaid on the different distribution port for connecting an optical fiber connected to the particular ONT.

8. The method of claim 1, further comprising:

presenting, by the client device via the PON repair application, a splitter display indicating each of a plurality of splitters in the PON and an indication of a particular splitter coupled to the particular ONT via an optical fiber.

9. A client device for identifying connected ports in a Passive Optical Network (PON), the client device comprising:

one or more processors;

a non-transitory computer-readable memory storing instructions thereon that, when executed by the one or more processors, cause the client device to:

establish a communication session, via a short-range communication link, with a particular optical network terminal (ONT) in a PON, wherein the PON includes an optical line terminal (OLT) optically connected to the ONT via one or more optical fibers and a distribution port;

obtain indications of a plurality of distribution ports in the PON and a plurality of ONTs corresponding to the plurality of distribution ports, wherein the plurality of ONTs include the particular ONT which is in communication with the client device;

present, via a PON repair application, the indications of the plurality of distribution ports in the PON and the plurality of ONTs corresponding to the plurality of distribution ports;

obtain, via a user control presented on the PON repair application, an indication of a different distribution port corresponding to the particular ONT; and store, via the PON repair application, the different distribution port in association with the particular ONT.

10. The client device of claim 9, wherein to present the indications of the plurality of distribution ports in the PON and the plurality of ONTs corresponding to the plurality of distribution ports, the instructions cause the client device to:

highlight, via the PON repair application, an indication of the distribution port corresponding to the particular ONT.

11. The client device of claim 9, wherein the OLT is optically connected to one or more fiber distribution hubs having one or more splitters, each of the one or more splitters having a subset of the plurality of distribution ports for connecting to a subset of the plurality of ONTs.

12. The client device of claim 11, wherein the instructions further cause the client device to:

for the plurality of distribution ports, present, via the PON repair application, an indication of a splitter that houses the distribution port and an indication of one of the plurality of ONTs that connects to the distribution port via an optical fiber.

13. The client device of claim 9, wherein the instructions further cause the client device to:

present, via the PON repair application, the user control for changing the distribution port corresponding to the particular ONT which is in communication with the client device.

14. The client device of claim 9, wherein the instructions further cause the client device to:

provide a set of instructions for a user to follow to repair the particular ONT including an instruction to reconnect the particular ONT to the different distribution port.

15. The client device of claim 14, wherein the instructions further cause the client device to:

provide one or more augmented reality features overlaid on the different distribution port for connecting an optical fiber connected to the particular ONT.

16. The client device of claim 9, wherein the instructions further cause the client device to:

present, via the PON repair application, a splitter display indicating each of a plurality of splitters in the PON and an indication of a particular splitter coupled to the particular ONT via an optical fiber.

17. A non-transitory computer-readable memory storing instructions thereon that, when executed by one or more processors, cause the one or more processors to:

establish a communication session, via a short-range communication link, with a particular optical network terminal (ONT) in a PON, wherein the PON includes an optical line terminal (OLT) optically connected to the ONT via one or more optical fibers and a distribution port;

obtain indications of a plurality of distribution ports in the PON and a plurality of ONTs corresponding to the plurality of distribution ports, wherein the plurality of ONTs include the particular ONT which is in communication with the one or more processors in a client device;

present, via a PON repair application, the indications of the plurality of distribution ports in the PON and the plurality of ONTs corresponding to the plurality of distribution ports;

obtain, via a user control presented on the PON repair application, an indication of a different distribution port corresponding to the particular ONT; and store, via the PON repair application, the different distribution port in association with the particular ONT.

18. The non-transitory computer-readable memory of claim 17, wherein to present the indications of the plurality of distribution ports in the PON and the plurality of ONTs corresponding to the plurality of distribution ports, the instructions cause the one or more processors to:

highlight, via the PON repair application, an indication of the distribution port corresponding to the particular ONT.

19. The non-transitory computer-readable memory of claim 17, wherein the OLT is optically connected to one or more fiber distribution hubs having one or more splitters, each of the one or more splitters having a subset of the plurality of distribution ports for connecting to a subset of the plurality of ONTs.

20. The non-transitory computer-readable memory of claim 19, wherein the instructions further cause the one or more processors to:

for the plurality of distribution ports, present, via the PON repair application, an indication of a splitter that houses the distribution port and an indication of one of the plurality of ONTs that connects to the distribution port via an optical fiber.

* * * * *